US012054428B2

(12) United States Patent
Jawaid et al.

(10) Patent No.: US 12,054,428 B2
(45) Date of Patent: Aug. 6, 2024

(54) PREPARATION OF LAYERED MXENE VIA ELEMENTAL HALOGEN ETCHING OF MAX PHASE

(71) Applicant: Government of the United States, as represented by the Secretary of the Air Force, Wright-Patterson AFB, OH (US)

(72) Inventors: Ali M. Jawaid, Fairborn, OH (US); Richard A. Vaia, Beavercreek, OH (US); Asra Hassan, Tallahassee, FL (US)

(73) Assignee: United States of America as represented by the Secretary of the Air Force, Rome, NY (US)

( * ) Notice: Subject to any disclaimer, the term of this patent is extended or adjusted under 35 U.S.C. 154(b) by 981 days.

(21) Appl. No.: 17/037,883

(22) Filed: Sep. 30, 2020

(65) Prior Publication Data
US 2021/0139379 A1    May 13, 2021

Related U.S. Application Data

(60) Provisional application No. 62/934,025, filed on Nov. 12, 2019.

(51) Int. Cl.
C04B 35/56    (2006.01)
C01B 21/06    (2006.01)
(Continued)

(52) U.S. Cl.
CPC ...... C04B 35/5611 (2013.01); C01B 21/0602 (2013.01); C01B 32/90 (2017.08);
(Continued)

(58) Field of Classification Search
CPC . C04B 35/5611; C04B 35/622; C04B 41/009; C04B 41/5338; C04B 2235/3817;
(Continued)

(56) References Cited

U.S. PATENT DOCUMENTS

2014/0162130 A1*  6/2014  Barsoum ............... C01B 32/914
                                                     429/231.8
2019/0166733 A1*  5/2019  Gogotsi ................... H01B 1/20

* cited by examiner

Primary Examiner — Anthony J Zimmer
Assistant Examiner — Syed T Iqbal
(74) Attorney, Agent, or Firm — AFRL/RI; Randall P. Jones

(57) ABSTRACT

A method of making a layered MXene material comprises a) introducing dried MAX phase powder into a vessel under anhydrous, inert conditions, the MAX phase powder comprising a general formula of $M_{n+1}AX_n$ (n=1, 2, 3, or 4), wherein M is a transition metal or p-block metalloid selected from the group consisting of Ti, Zr, Hf, V, Nb, Ta, Cr, Mo, W, Re, Cu, Ni, Ag, Zn, Cd, In, Sn, and Pb; interlayer A is a Group III, IV, or V metalloid selected from the group consisting of Al, Si, Ga, Ge, In, Sn, Pb, As, Bi, Sb, and X is one of C (carbon) and N (nitrogen); b) introducing a halogen and solvent to the dried MAX phase to create a halogen solution having a predetermined concentration; c) allowing a reaction to proceed for about 24 hours between 30-90° C. to create a reaction slurry comprising a MXene material.

12 Claims, 32 Drawing Sheets
(32 of 32 Drawing Sheet(s) Filed in Color)

(51) Int. Cl.
*C01B 32/90* (2017.01)
*C04B 35/622* (2006.01)
*C04B 41/00* (2006.01)
*C04B 41/53* (2006.01)

(52) U.S. Cl.
CPC .......... *C04B 35/622* (2013.01); *C04B 41/009* (2013.01); *C04B 41/5338* (2013.01); *C01P 2002/20* (2013.01); *C04B 2235/3817* (2013.01); *C04B 2235/444* (2013.01); *C04B 2235/74* (2013.01)

(58) Field of Classification Search
CPC .......... C04B 2235/444; C04B 2235/74; C01B 21/0602; C01B 32/90; C01P 2002/20; C01P 2004/24

See application file for complete search history.

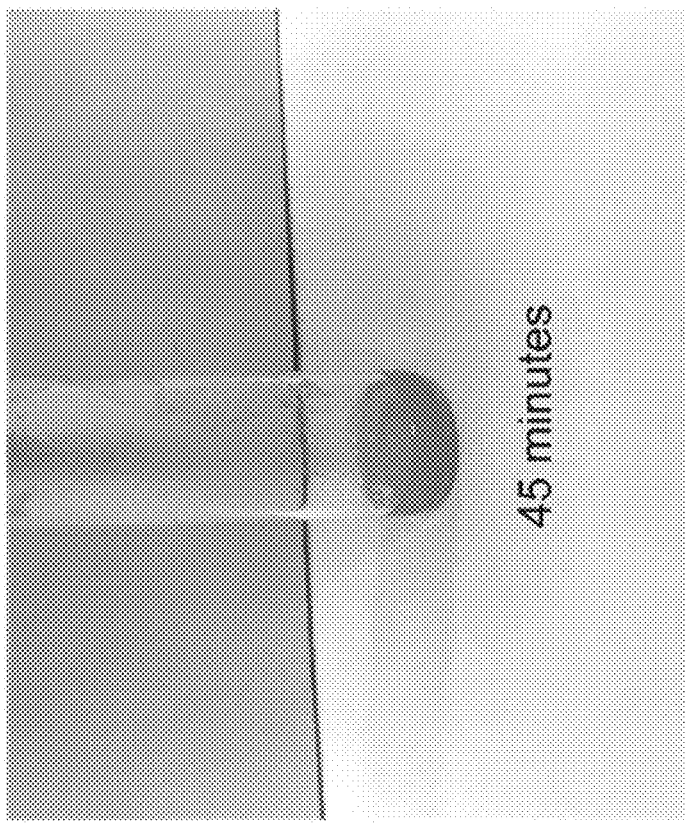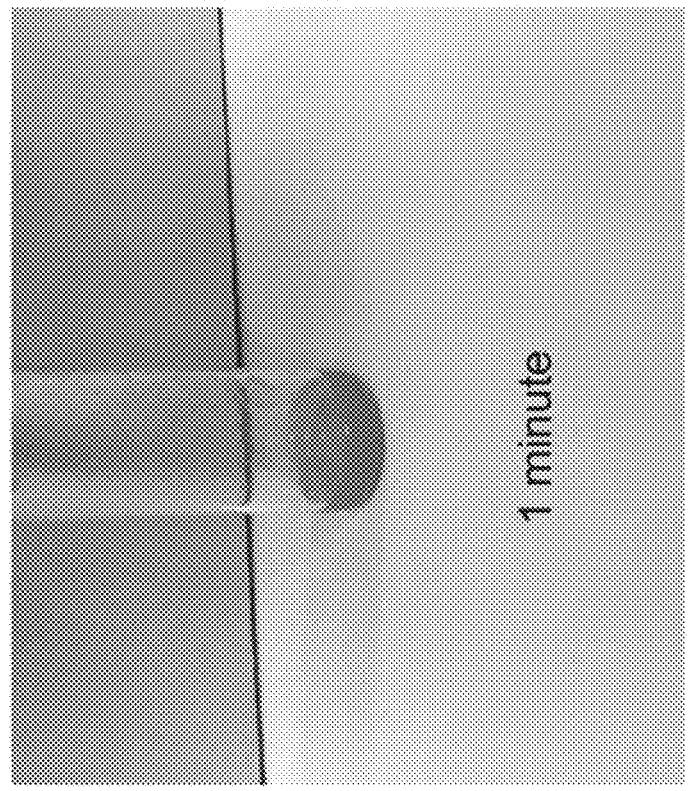
FIG. 8

Br$_2$ as Etchant for Ti$_3$AlC$_2$

| Solvent | MAX phase concentration (Molarity) | Etchant concentration (vol%) | Optimal Etchant concentration (vol%) | MAX:Etchant (mol:mol) | Optimal MAX:Etchant (mol:mol) | Temperature range (°C) | Optimal Temperature range (°C) | Time (hrs) | Optimal Time (hrs) | Notes |
|---|---|---|---|---|---|---|---|---|---|---|
| Cyclohexane | 1 | 1 – 10 | 10 | 1 – 5 | 1:2 | 25 – 70 | -25 | 1 – 48 hrs | 8 – 24 | Supernatant light yellow at end point |
| CS$_2$ | 1 | 1 – 10 | 10 | 1 – 5 | 1:2 | 25 – 50 | -25 | 1 – 48 hrs | 8 – 24 | Supernatant light yellow at end point |
| CHCl$_3$ | 1 | 1 – 10 | 10 | 1 – 5 | 1:2 | 50 – 100 | -50 | 1 – 48 hrs | N/A | Supernatant still red after 48 hrs |
| Methanol | 1 | 10 – 40 | 30 | 1 – 5 | 1:2 | 25 – 50 | -25 | 1 – 48 hrs | 48 hrs | Supernatant yellow, exposure to air results in acrid odor |
| CH$_3$CN | 1 | 1 – 10 | N/A | 1 – 5 | N/A | 25 – 50 | N/A | 1 – 48 hrs | N/A | Violently exothermic |

FIG. 14

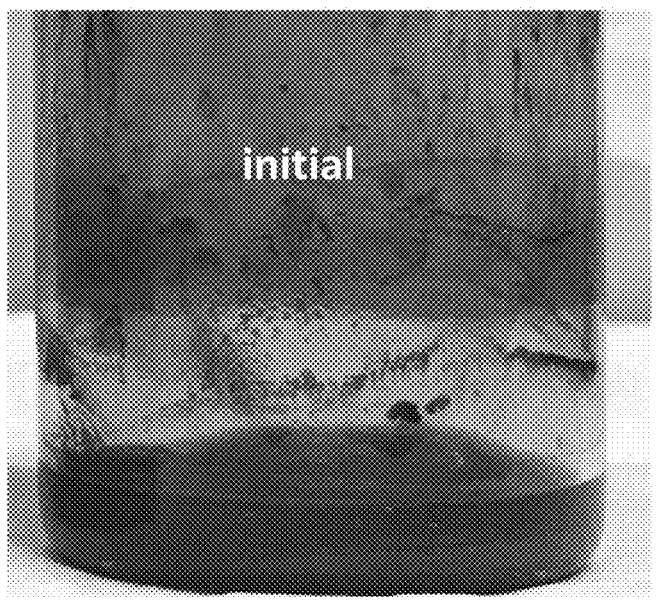
Process flow:
MAX (1 mmol)
Br$_2$ (2 mmol)
Cyclohexane (1 mL; 10% Br$_2$ concentration)
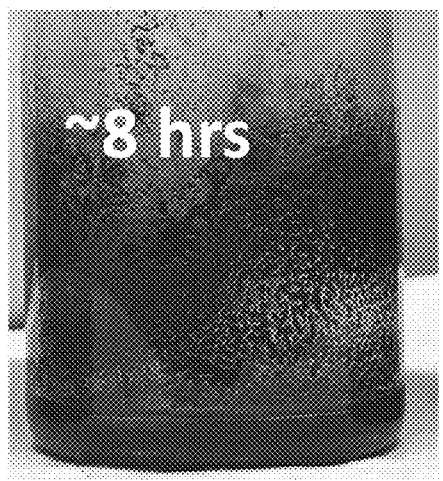
@ RT
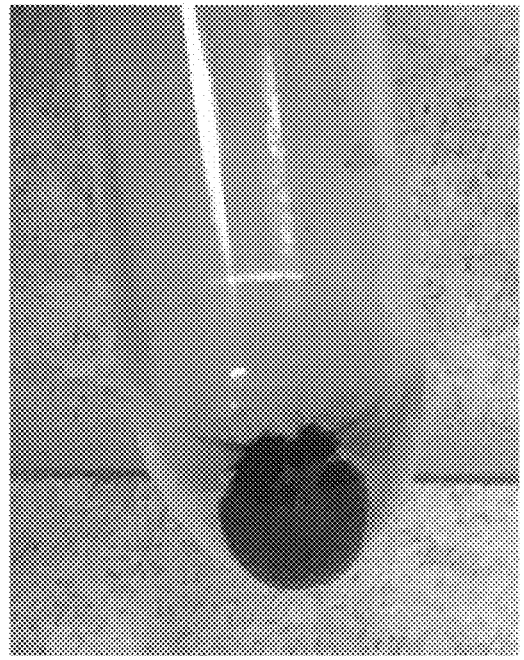
Centrifuge, decant, redisperse 3x
FIG. 19

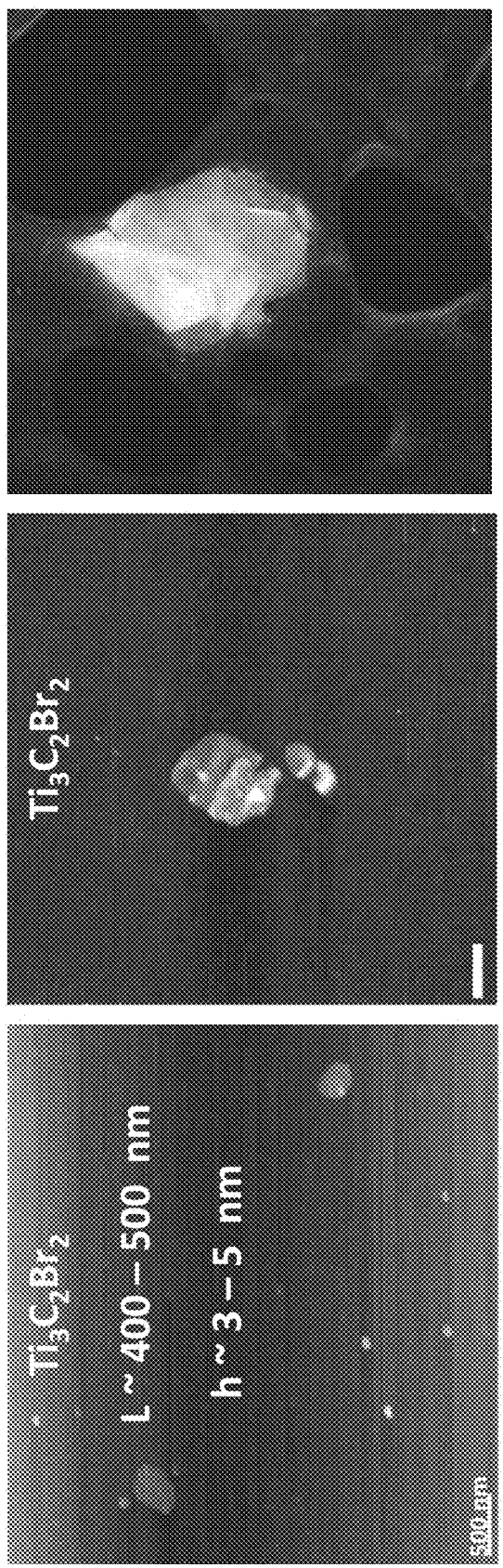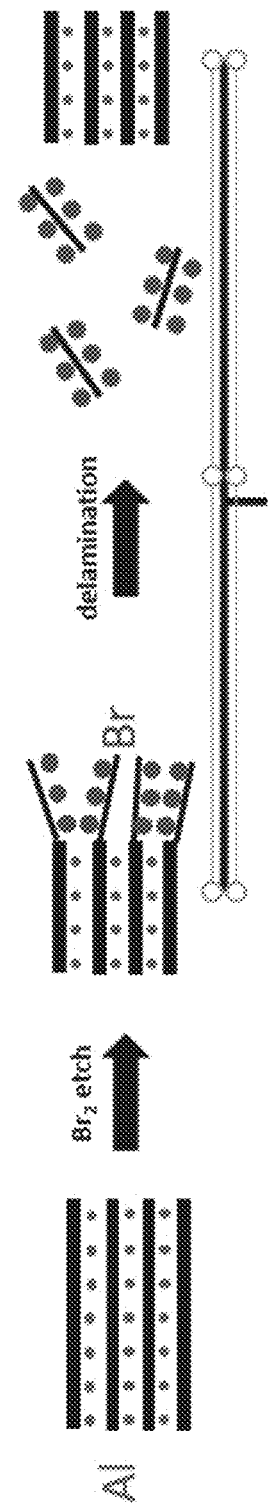
FIG. 20

$I_2$ as Etchant for $Ti_3AlC_2$

| Solvent | MAX phase concentration (Molarity) | Etchant concentration (vol%) | Optimal Etchant concentration (vol%) | MAX:Etchant (mol:mol) | Optimal MAX:Etchant (mol:mol) | Temperature range (°C) | Optimal Temperature range (°C) | Time (hrs) | Optimal Time (hrs) | Notes |
|---|---|---|---|---|---|---|---|---|---|---|
| Cyclohexane | 1 | 10 – 20 | 10 | 1 – 5 | 1:2 | 50 – 70 | Reflux (70 C) | 1 – 48 hrs | 8 – 24 | Supernatant light purple end point |
| $CS_2$ | 1 | 1 – 20 | 10 | 1 – 5 | 1:2 | 25 – 45 | Reflux (45 C) | 1 – 48 hrs | 8 – 24 | Supernatant light purple end point |
| $CHCl_3$ | 1 | 1 – 10 | N/A | 1 – 5 | N/A | 25 – 50 | Reflux (50 C) | 1 – 48 hrs | N/A | Supernatant deep purple 48 hrs |
| Methanol | 1 | 10 – 40 | 30 | 1 – 5 | 1:2 | 25 – 50 | Reflux (60 C) | 1 – 48 hrs | 48 hrs | Supernatant deep red 48 hrs |

FIG. 21

ICl as Etchant for Ti$_3$AlC$_2$

| Solvent | MAX phase concentration (Molar(s)) | Etchant concentration (vol%) | Optimal Etchant concentration (vol%) | MAX:Etchant (mol:mol) | Optimal MAX:Etchant (mol:mol) | Temperature range (°C) | Optimal Temperature range (°C) | Time (hrs) | Optimal Time (hrs) | Notes |
|---|---|---|---|---|---|---|---|---|---|---|
| Cyclohexane | 1 | 10 – 20 | 10 | 1 – 5 | 1:2 | -78 | (-78 C) | 1 – 48 hrs | 8 – 24 | Supernatant light purple end point |
| CS$_2$ | 1 | 1 – 20 | 10 | 1 – 5 | 1:2 | -78 | (-78 C) | 1 – 48 hrs | 8 – 24 | Supernatant light purple at end point |

FIG. 22

IBr as Etchant for Ti$_3$AlC$_2$

| Solvent | MAX phase concentration (Mol/vol) | Etchant concentration (vol%) | Optimal Etchant concentration (vol%) | MAX:Etchant (mol:mol) | Optimal MAX:Etchant (mol:mol) | Temperature range (°C) | Optimal temperature range (°C) | Time (hrs) | Optimal Time (hrs) | Notes |
|---|---|---|---|---|---|---|---|---|---|---|
| Cyclohexane | 1 | 10 – 20 | 10 | 1 – 6 | 1:2 | 25 – 70 | 25 | 1 – 48 hrs | 8 – 24 | Supernatant light purple end point |
| CS$_2$ | 1 | 1 – 20 | 10 | 1 – 5 | 1:2 | 25 – 45 | 25 | 1 – 48 hrs | 8 – 24 | Supernatant light purple end point |

FIG. 23

| Etchant | Ti₃AlC₂ (deg; Ang) | Ti₃C₂Xₓ peak (Ang) | Δ(002) (Ang) |
|---|---|---|---|
| Br$_2$ | 9.3 | 10.05 | 0.7 |
| I$_2$ | 9.3 | 10.40 | 1.1 |
| ICl | 9.3 | 11.3 | 2 |
| IBr | 9.3 | 10.05 | 0.7 |

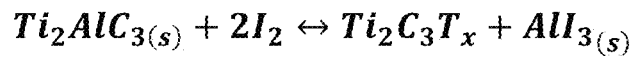

$$Ti_2AlC_{3(s)} + 2I_2 \leftrightarrow Ti_2C_3T_x + AlI_{3(s)}$$

Should react in a ~ 1:2 ratio MAX : $I_2$ $T_x = I, OH(?)$

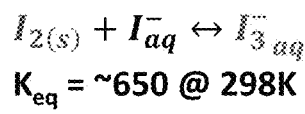

$$I_{2(s)} + I^-_{aq} \leftrightarrow I^-_{3\,aq}$$

$K_{eq} = $ ~650 @ 298K $I_2$ = purple
$I^-$ = colorless
$I_3^-$ = red

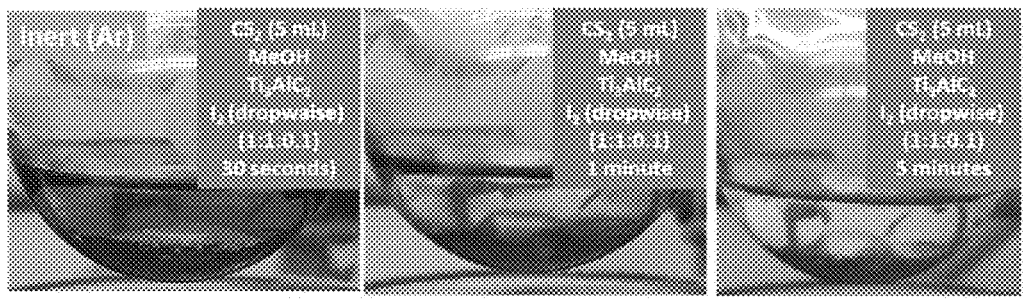

Slow addition of $I_2$ to MAX phase in $CS_2$/MeOH results in equilibria forming, and Iodine being consumed. MAX phase slowly swells. XRD of all powders look identical

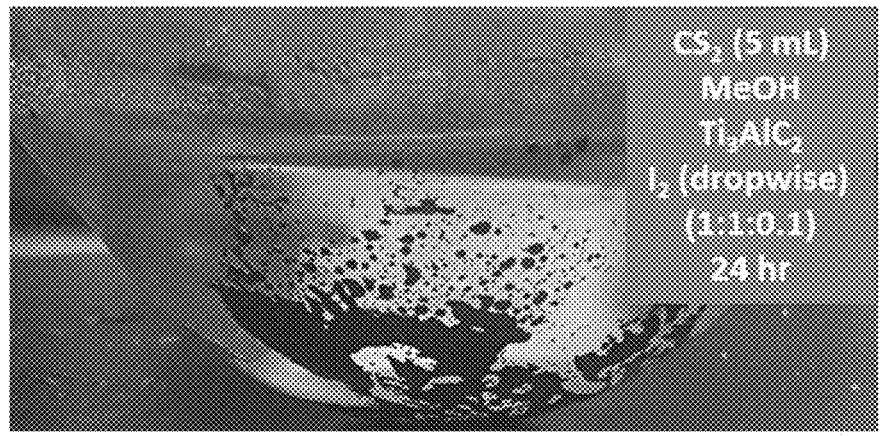

After 24 hours, the MAX phase coats glass vessel and reaction stops... this is after ~0.25 mmol $I_2$ is added to 1 mmol MAX, much below the expect 2:1 ratio

FIG. 25

Drying supernatant results in yellowish precipitate, consistent with $AlI_3 \cdot 6H_2O$
Note: $Br_2$ reaction results in white precipitate, consistent with $AlBr_3$
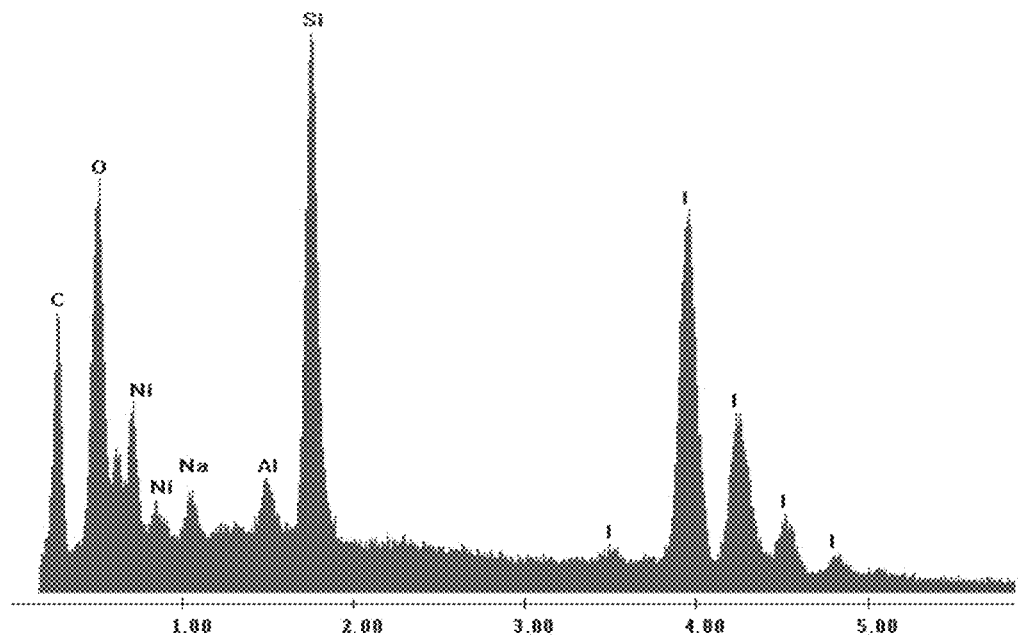
EDS resolves Aluminum species, no Ti (appears at ~5 keV)
FIG. 26

FIG. 27

| Etchant | $X_2$ : $Ti_3AlC_2$ (mol:mol) | wt% $X_2$ | notes |
|---|---|---|---|
| $CS_2/I_2$ | 0.1 | <0.1% | no new 00ℓ series |
| $CS_2/Br_2$ | 0.1 | <0.1% | no new 00ℓ series |
| $CS_2/I_2$ | 1 | 1% | no new 00ℓ series |
| $CS_2/I_2$ | 1 | 10% | new 00ℓ series @ 2.4 nm |
| $CS_2/I_2$ | 1 | 10% | new 00ℓ series @ 3.1 nm |
| $MeOH/I_2$ | 1 | 10% | new 00ℓ series @ 1.05 nm |
| $MeOH/Br_2$ | 1 | 10% | new 00ℓ series @ 1.1 nm |

- Too low $X_2$: MAX to etch out Al layer (rows 1–2)
- Too low wt% $X_2$ to etch out Al layer (row 3)
- Sufficient $X_2$: MAX and wt% for Al etching (Same experiment repeated twice… slightly different 00ℓ series) (rows 4–5)
- Sufficient $X_2$: MAX and wt% for Al etching (rows 6–7)

*Note: MeOH was added to $CS_2$ etchant solutions to initiate $I_2 + I^- \rightarrow I_3^-$ equilibria. It was thought this was driving etching. Looking more into literature, HX acids are not good for etching Al.

Need sufficient amount of $X_2$ to etch out MAX phase (1:1 ratio works, maybe higher ratios work better)
Need sufficient $X_2$ concentration to etch out MAX phase as well (<10% does not produce 00ℓ series)

This is consistent with metals etching community

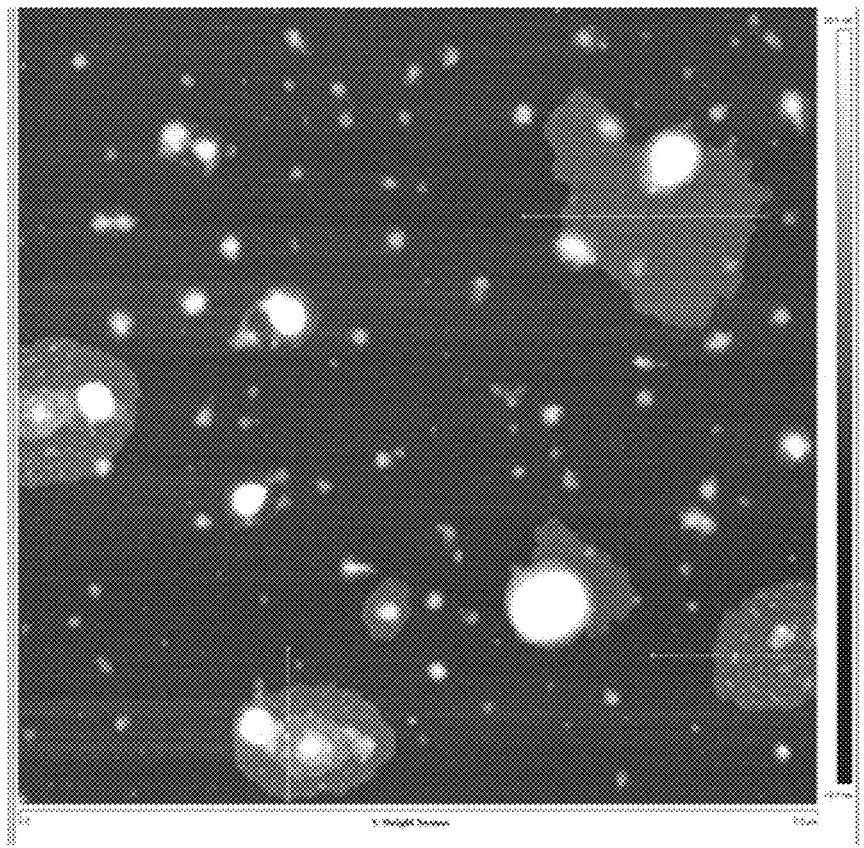
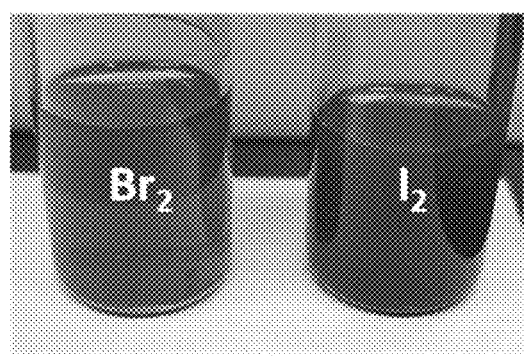
Ti₃AlC₂ + X₂
(X = Br, I) in a 1:1 ratio
Just prepared this morning
Looks like original sample
Brown / black
Plasmon peaks
No scatter
FIG. 30

PREPARATION OF LAYERED MXENE VIA ELEMENTAL HALOGEN ETCHING OF MAX PHASE

Pursuant to 37 C.F.R. § 1.78(a)(4), this application claims the benefit of and priority to prior filed Provisional Application Ser. No. 62/934,025, filed 12 Nov. 2019, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to the preparation of layered MXene and, more particularly, to the preparation of layered MXene via elemental halogen and interhalogen etching of MAX phase.

BACKGROUND OF THE INVENTION

Layered transition metal carbides, nitrides, and carbonitrides, also known as MXenes, offer a unique combination of high electrical conductivity and excellent mechanical properties, which are rarely seen in other 2D crystals, such as element-enes (e.g. phosphene), transition metal dichalcogenides (TMDs), phyllosilicates (nanoclays), etc. MXenes are described by a general chemical formula of $M_{n+1}X_nT_x$ (n=1-3), where M represents an early transition metal, X is carbon, nitrogen, or a combination of each and $T_x$ represents the surface terminations. They are produced by the selective etching of the A interlayer from their parent three-dimensional MAX phase ($M_{n+1}AX_n$). Delamination and incorporation of the MXene layers into composites, inks, and films have attracted considerable attention in conductive coatings, optoelectronics, catalysis, and energy storage.

Current state of the art (SOA) requires the use of HF as an etchant (via in-situ generation of HF via salts or acids, e.g. LiF/HCl, $NaHF_2$, $KHF_2$, $NH_4HF_2$) for the A atoms in MAX phases (e.g. 20% HF to $Ti_3AlC_2$ for 24 hrs, 50% $HF/H_2O_2$ to $Ti_3SiC$ for 12 hrs). A mixture of MAX powders and etchant produce a clay-like precipitate, which upon post-processing (aqueous washing, intercalation, and mechanical agitation) yields a distribution of MXene morphologies. However, HF-containing waste is highly toxic and corrosive. Purification of crude slurries requires tightly regulated and controlled protocols due to the corrosiveness and acute toxicity of HF waste streams. Additionally, MXenes, such as $Ti_3C_2T_x$, are hydrolytically unstable, thus quality and yield varies significantly. Furthermore, the MXene surface prepared via these aqueous HF methods is compositionally heterogeneous, containing fluoro-, oxo- and hydroxyl-terminations. Properties, such as optical, electronic, and chemical performance, are highly sensitive to the surface structure and composition, resulting in suboptimal performance for super-capacitors, electro-magnetic coatings, and other applications.

After etching, optimization of the reaction conditions and monitoring of the progression of the etch is done qualitatively by a color change from gray (MAX phase) to black (MXene). Quantitatively, the powders are analyzed by wide angle x-ray scattering (WAXS) where the 001 series of the MAX phase shifts to larger spacings (for example, 0.90 nm and 0.94 nm, respectively for $Ti_3AlC_2$ and $Ti_3C_2T_x$). Additionally, the 001 series reflections are broadened, indicating a distorted structure due to variable surface termination, $T_x$, ($T_x$=OH, O, F) of M atoms (see FIG. 1 for overview). The resulting MXene materials are washed repeatedly with water, upon which exfoliated MXene materials may be extracted via standard centrifugation and sonication methods, where yields approach 5% of the initial MAX phase used (i.e. 25 mg from 5 gram of powder). The yield is typically determined by the mass difference of extracted MXene powders from MAX phase, taking into account the loss of the interlayer A atoms and the addition of $T_x$ atoms. Due to the aqueous nature of this process, resulting in a significant amount of hydroxyl terminations on the MXene surface, the obtained material is dispersible in water, which restricts direct organic functionalization of the surface. As such, intermediate steps using surfactants or other surface modification is necessary to transfer MXenes to organic media for subsequent surface chemistry. What is desired is a methodology that does not require HF, or aqueous media, to selectively etch the A interlayer of MAX phases to exfoliate MXene layered materials.

SUMMARY OF THE INVENTION

The present invention overcomes the foregoing problems and other shortcomings, drawbacks, and challenges of prior art methods of MXene preparation. While the invention will be described in connection with certain embodiments, it will be understood that the invention is not limited to these embodiments. To the contrary, this invention includes all alternatives, modifications, and equivalents as may be included within the spirit and scope of the present invention.

The formation of MXenes with a broad-range of homogeneous surfaces thus remains an experimental challenge. To this end, we discuss an efficient, room-temperature, etching method to remove the A-layer using elemental halogen and inter-halogen compounds to produce exfoliated MXenes with homogeneous Cl, Br, or I surfaces.

In this invention, we propose a novel pathway for the preferential etching of the A layer, typically a Group III, IV, or V metalloid (A=Aluminum, Silicon, Germanium, Gallium, Indium, Tin) in MAX type materials to generate colloidally stable, layered MXenes. This is a significant contrast from the methods reported to date, which have utilized aqueous hydrogen fluoride (HF) solutions as a primary etchant as well as solid-state molten transition metal halide salts ($MX_2$; M=Zn, Cd, Hg); X=Cl, Br) to selectively remove the A-interlayer binding phase.

In this invention, we propose a novel pathway for the preferential etching of the A layer (A=Aluminum, Silicon, Germanium, Gallium, Indium, Tin) in MAX-type materials, e.g. titanium aluminum carbides, to generate colloidally-stable, layered MXenes (see FIG. 1). The material space is large, containing over 60 MAX phases where approximately less than 10 MXenes have been successfully etched and delaminated by removal of the A interlayer. As of January 2020, most methods reported have utilized hydrogen fluoride (HF) as a primary etchant to selectively remove the A-interlayer binding phase, where the most prevalent and used methods require 20-30 wt % HF solutions. Due to the acute toxicity and inherent dangers in working with even diluted HF solutions, the invention of a safe, alternate route for MXene etching is desirable. Here, we propose and demonstrate a safer route based on elemental halogens (e.g. bromine, iodine, chlorine) or interhalogen species (e.g. iodine monochloride, iodine monobromide, bromine monochloride) to selectively etch the A-layer. As examples of this concept, bromine, iodine, and interhalogens are used to etch aluminum from titanium aluminum carbides (TACs) to generate the corresponding titanium carbide MXene material. This method is scalable, safe, and does not present the immediate dangers that HF-based etchants pose. Additionally, MXenes are easily dispersed in a large range of solvents, such as tetrahydrofuran and acetonitrile, because of this new etching procedure. Due to these characteristics, MXenes are promising candidates for multifunctional fillers for next generational EMI and RF shielding composites due to their exceptional conductivity. In addition to their conductivity, MXene's ability to accommodate large species (neutral, cationic, anionic) within the interlayer gap makes them appealing for energy storage and reusable desalinization filters. Finally, the use of MXenes rather than MAX phases will greatly enhance coating techniques for thermal protection systems. Their solution stability enables blending with other thermal oxidative materials to create new ablative/protection coatings at lower cost, on new substrates, and with more complex structures.

According to one embodiment of the present invention a method of making a layered MXene material comprises a) introducing a dried MAX phase powder into a vessel under anhydrous, inert conditions, wherein the MAX phase powder comprises a general formula of $M_{n+1}AX_n$ (n=1, 2, 3, 4), wherein M is a transition metal or p-block metalloid selected from the group consisting of Ti, Zr, Hf, V, Nb, Ta, Cr, Mo, W, Re, Cu, Ni, Ag, Zn, Cd, In, Sn, and Pb; interlayer A is a Group III, IV, or V metalloid and is selected from the group consisting of Al, Si, Ga, Ge, In, Sn, Pb, As, Bi, Sb, and X is one of C (carbon) and N (nitrogen); b) introducing a halogen and solvent to the dried MAX phase to create a halogen solution having a predetermined concentration; c) allowing a reaction to proceed for about 24 hours between 30-90° C. to create a reaction slurry comprising a MXene material.

The method may further include d) monitoring the reaction to observe interlayer spacing of the MAX phase, wherein the reaction is complete when the ratio of the peak intensities remains constant or when the MAX phase peak disappears.

The method may further include e) extracting the reaction slurry via addition of anhydrous chloroform, acetone, or acetonitrile, or tetrahydrofuran.

The method may further include 0 centrifuging at 9000-12000 rpm to separate the $AX_3$ product from the MXene materials.

The method may further include g) discarding the supernatant containing the $AX_3$ product, and adding fresh chloroform, acetone, or acetonitrile, or tetrahydrofuran, and h) repeating this process as desired, resulting in a MXene slurry.

The method may further include i) suspending the slurry in a non-polar solvent; j) centrifuging at 1000 rpm for 1 hour to sediment any un-exfoliated MAX phase materials; and k) collecting the supernatant which contains MXene flakes.

The method may further include l) quenching or extracting excess halogen and etched byproducts with a Lewis base.

According to a further variation of the method, the halogen and solvent of step b) are at least one of non-polar solvents selected from the group consisting of cyclohexane, benzene, toluene, xylenes, naphtha, anthrazene, carbon disulfide, chloroform, and dichloromethane, polar solvents selected from the group consisting of methanol and acetonitrile, with at least one of iodine ($I_2$) and bromine ($Br_2$) to create a 15-25 wt % halogen solution.

According to another variation of the method, the time period of about 24 hours is anywhere between 1 and 36 hours, and when bromine ($Br_2$) is selected, the temperature of about 35° C. is between 30-40° C.

According to a further variation of the method, the time period of about 24 hours is between 1 and 36 hours, and when iodine ($I_2$) is selected the temperature of about 35° C. is between 50-70° C.

According to another variation of the method, the non-polar solvent is at least one of THF (tetrahydrofuran), acetonitrile, and $CHCl_3$.

According to a further variation of the method, the non-polar solvent is at least one of $CS_2$, $CHCl_3$, cyclohexane, and benzene, with the addition of tetrabutylammonium halide (TBAX; X=F, Cl, Br, I) stabilizer comprising a non-nucleophilic, coordinating Lewis base.

According to another variation of the method, introducing a halogen of step b) further comprises: b1) introducing elemental $X_2$, wherein X=F, Cl, Br, or I.

According to a further variation of the method, introducing a halogen of step b) further comprises: b1) introducing an in-situ halogen generating species.

According to another variation of the method, introducing a halogen of step b) further comprises: b1) introducing one or more solid state organo or inorganic halogen precursors, such as $PX_5$, $PX_3$ (X=Cl, Br), N-halo-succinimides (NXS; X=Cl, Br, I).

According to a further variation of the method, introducing a halogen of step b) further comprises: b1) introducing one or more mixed halogen species selected from the group consisting of iodine monochloride, iodine monobromide, and bromine monochloride.

According to another variation of the method, an etching rate of the A-interlayer is tunable by changing reactant concentrations (5-20 vol % X, X=Cl, Br, I) and operating temperatures (−70° C. to 80° C.) in step c).

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

FIG. 8 presents an image of TBAX treated Ti$_3$C$_2$Br supernatant after isolating it from the reaction mixture and exposing it to ambient conditions. Over the course of ~45 minutes, the reaction supernatant remains the same which indicates minimal to no hydrolysis of AlBr$_3$.

FIG. 14 presents a matrix of results when bromine is used as an etchant for Ti$_3$AlC$_2$.

FIGS. 19-20 present images regarding the characterization of MXenes etched with Br$_2$.

FIG. 21 presents a matrix of results when iodine was used as an etchant for Ti$_3$AlC$_2$.

FIG. 22 presents ICl as an etchant for Ti$_3$AlC$_2$.

FIG. 23 presents IBr as an etchant for Ti$_3$AlC$_2$.

FIG. 25 illustrates iodine as an etchant.

FIG. 26 (upper image) depicts drying the supernatant results in a yellowish precipitate, consistent with AlI$_3$.6H$_2$O.

FIG. 26 (bottom image) demonstrates that EDS resolves aluminum species, and no Ti.

FIG. 27 presents a table with seven different combinations of etchant (i.e. I$_2$, Br$_2$) and solvent (i.e. CS$_2$, MeOH) and different X$_2$:Ti$_3$AlC$_2$ ratios and wt % of X$_2$.

FIGS. 28-30 present structure and UV-Vis analysis of I$_2$ etched Ti$_3$AlC$_2$ in CS$_2$.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The unique property suite of two-dimensional MXenes is driving interest in various applications, including energy storage, electromagnetic shielding, and conductive coatings.

Conventionally, MXenes are synthesized by wet-chemical etching of the parent MAX-phase in HF-containing media. The acute toxicity of HF hinders scale up, and competing surface hydrolysis challenges control of surface composition and grafting methods. Herein, we present an efficient, room-temperature etching method that utilizes halogens ($Br_2$, $I_2$, ICl, IBr) in anhydrous media to synthesize MXenes from $Ti_3AlC_2$. A radical mediated process depends strongly on the molar ratio of the halogen to MAX phase, absolute concentration of the halogen, solvent, and temperature. This etching method provides opportunities in developing new surface chemistry to modulate MXene properties.

A species-specific etch method must simultaneously balance (a) solubility of reactants in an inert medium; (b) formation of bound site-specific etch precursors; (c) reaction kinetics favoring liberation of a stable etch product that exposes sites for subsequent reactions; and (d) facile separation of these etch products to yield a purified final product. As an exemplar of halogen-based MXene production from $Ti_3AlC_2$, FIG. 2, images A-E, summarizes these criteria for the production of colloidally stable, layered $Ti_3C_2T_x$ ($T_x$=Br) using $Br_2$ to etch $Ti_3AlC_2$ in anhydrous cyclohexane (CH) with tetrabutyl ammonium bromide to stabilize etch byproducts.

Figure 1:
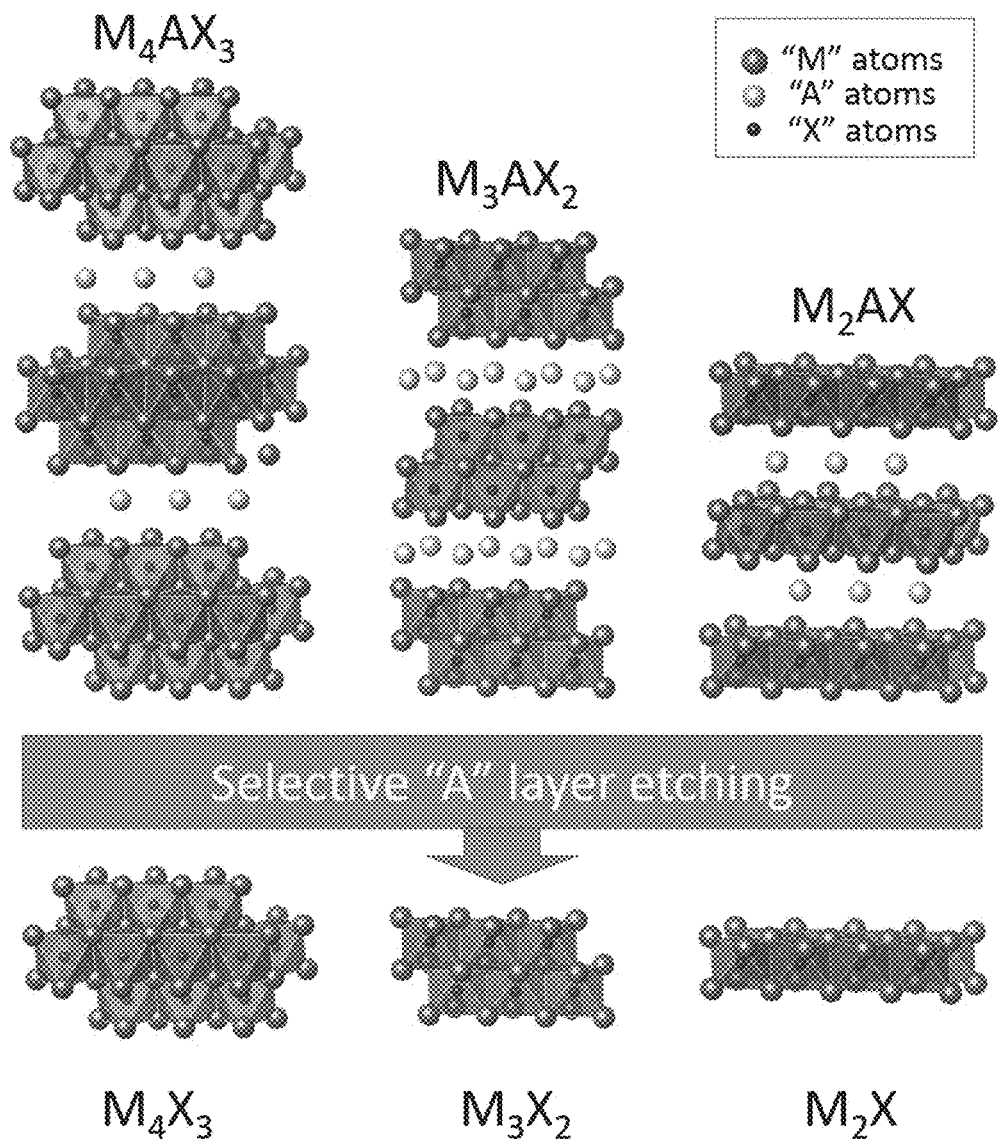
FIG. 1 depicts an overview of the selective etching of various MAX phase materials.
Figure 2:
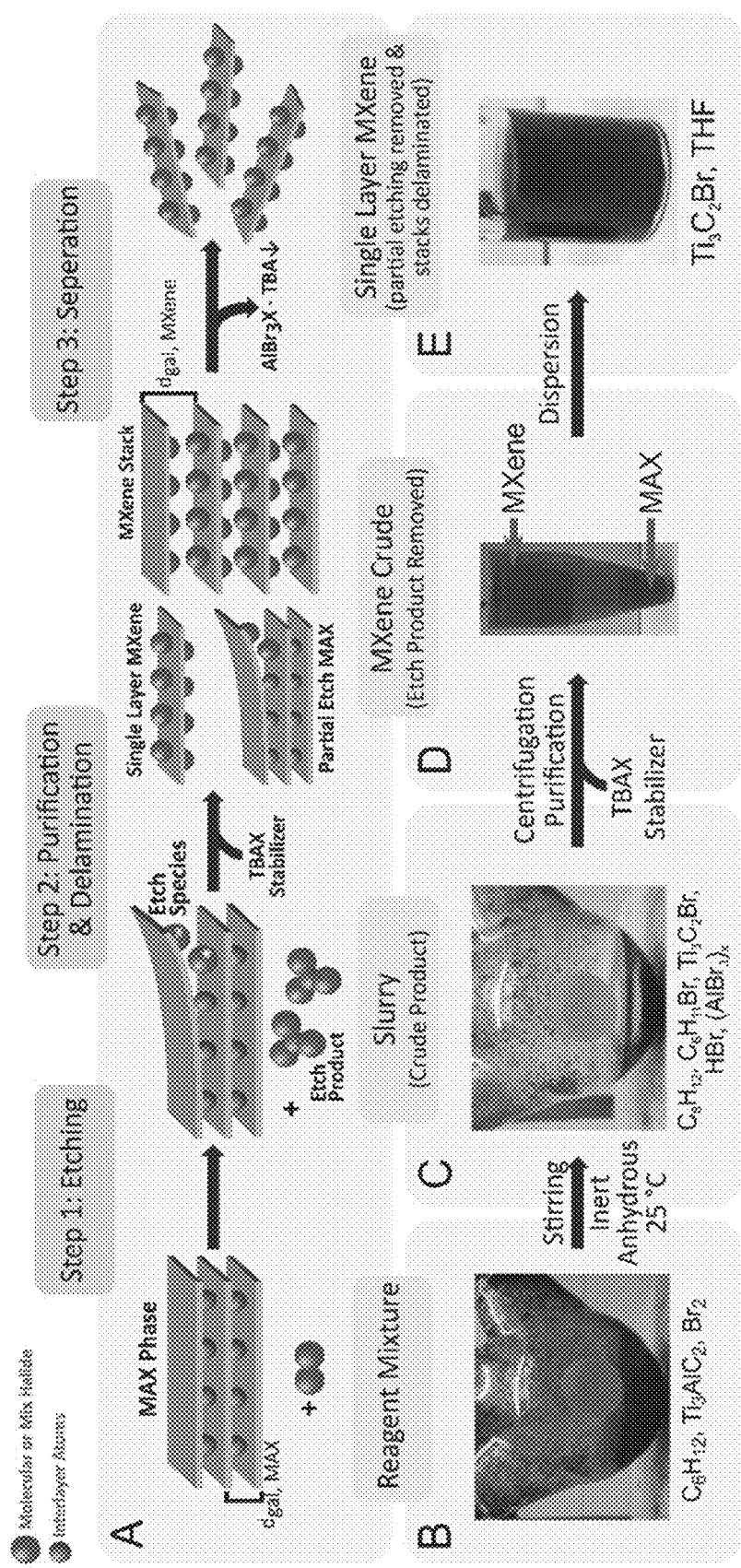
FIG. 2 illustrates the halogen etch of MAX phases. Image (A) illustrates a generalized process for the formation of delaminated, halogen-terminated MXenes. Image (B) illustrates the addition of $Br_2$ to $Ti_3AlC_2$ in anhydrous cyclohexane produces a deep red solution. Image (C) illustrates that as $Br_2$ reacts with the Al interlayer, the supernatant turns to a pale yellow color, reflecting depletion of $Br_2$ and production of $AlBr_3$ species. $AlBr_3$ is rendered inert by addition of stabilizers (tetrabutylammonium bromide, TBAX). Image (D) illustrates that the MXene crude is purified via repeated redispersion in non-polar solvent (i.e. CHCl$_3$). Image (E) illustrates the purified size-selected MXene is obtained via centrifugation and dispersed in THF.

In our process, many limitations of the current SOA are addressed. Elemental halogens, $X_2$ (X=Cl, Br, I) are used in non-polar, non-coordinating solvents, liberating $AlX_3$ species as etched products. As etching proceeds, the rate, purity, and extent may be monitored qualitatively. The reaction slurry is initially highly colored from the addition of $X_2$ (e.g. $Cl_2$ is green; $Br_2$ is red; $I_2$ is purple). Advantageously, acutely toxic HF is no longer required for selective etching of the A interlayer (A=Group III, IV, V metalloids, e.g. Al, Si, Ga, Ge, In, Sn). Secondly, the product is soluble in common ambipolar and hydrophobic organic solvents (THF, $CHCl_3$) that can be prepared anhydrously, thus increasing surface stability by limiting surface oxidation and decomposition by limiting exposure to $H_2O/O_2$. Additionally, post-processing of etched MXenes may be done via the addition of complexing agents to remove excess halogen, stabilizers for $AlX_3$, and the etched flakes extracted in a one-step work-up rather than a series of dilutions, redispersions, and centrifugation cycles as required for HF mediated methods. This reduces waste, potential exposure to chemicals, and is scalable. FIG. 2, image A, illustrates the halogen etch of layered MAX phase wherein bulk, MAX phase powders are mixed with a non-polar solvent in an inert, water free environment and elemental halogens or interhalogen species. As the halogen adsorbs to the MAX surface, homolysis occurs (red balls with *s), generating etch products, e.g. $AlBr_3$. Further penetration, homolysis, and shuttling of the etch products results in complete removal of the A layer and MXenes are isolated as colloidally stable flakes.

Our approach obtains similar yields and processing times as the conventional processes, but uses non-toxic solvents and etchants, allowing for high throughput, and scalable extraction of MXene materials. Quality and purity of MXenes may be evaluated via WAXS, where the emergence of a new 001 series and disappearance of the MAX 001 series is attributed to etching out the A-interlayer and replacement with termination of X (X=Cl, Br, I). Additionally, the resulting MXene are dispersible in THF and $CHCl_3$, which will facilitate a wide suite of organic reactions including ene-terminated organometallics (R-BuLi, R—MgBr) for thiol-click derivitization, or direct coupling with organic head-groups (—$NH_2$; —$PH_3$; —SH).

For MAX type phases, the M-X bonding is strong while the bonding along the M-A planes is weaker and allows for preferential bond cleavage given appropriate chemical reagents. Due to the strong etching potential of $X_2$ etchants, heterolytic cleavage of M-A bonds may be accomplished by introduction of elemental halogens. The mechanism proceeds via surface adsorption of the halogen, insertion of halogen between the labile M-A bonds, and liberation of $AlX_3$ species (X=Br, I) which is subsequently shuttled away from the material surface by the solvent. From this mechanism, the absolute concentration of halogen needs to be maintained above a certain threshold (determined to be ~10% for $Br_2$), the aluminum halide product needs to be soluble in solution, and reactions must be kept in strictly anhydrous conditions to avoid potential oxidation or undesirable polyhalide formation.

From the broad and complete solubility of halogens (e.g. R—OH, $CH_3CN$, THF, $CS_2$, ethers, naphtha, cyclohexane, toluene) and the ability to tune availability, etch rate, and reactivity of etchant (concentration, temperature, radical formation), dissolution rates of the A-interlayer may be tuned across the MAX phase material space. This is complemented by the isostructural MAX phase bonding along the M-A-M interface across the entire MAX phase allowing for this method to preferentially etch the A interlayer by careful choice of solvent, etchant, concentration, and temperature of MAX and etchant.

Figure 9:
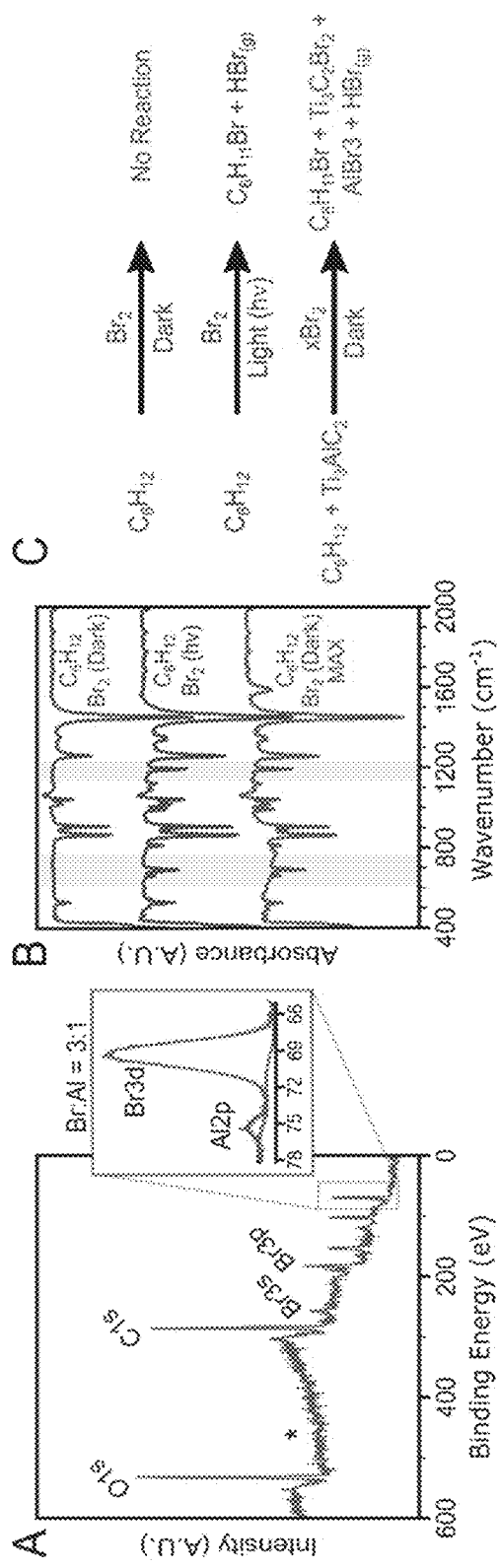
FIG. 9 presents etched products in the Ti$_3$AlC$_2$/Br$_2$ supernatant. Image (A) is an XPS survey spectrum of Br and Al that indicates a 3:1 stoichiometry (AlBr$_3$). The absence of Ti-2p (454-465 eV), confirms selective etching of the A layer. Image (B) (see also FIG. 18) presents FTIR spectra of the supernatant (red) in comparison to UV-activated Br* halogenation of cyclohexane (blue), and unreactive cyclohexane —Br$_2$ mixture (purple). Absorption peaks attributed to C$_6$H$_{11}$Br are highlighted. Image (C) is a summary of the reactions leading to the spectra in image B.

Due to the high reactivity of elemental halogens with Al, introduction of $Br_2$ to Al containing materials produces $(AlBr_3)_x$, where the x-mer dissociates readily into monomeric $AlBr_3$. For example, an initial deep red mixture (FIG. 2, image B) of $Ti_3AlC_2$ powder (1.0 mmol) suspended in a 2.0 M solution of bromine in cyclohexane (CH) changes to light yellow over 24 hours at RT and inert atmosphere, indicating consumption of the reddish brown $Br_2$ and production of pale yellow $AlBr_3$ (FIG. 2, image C). $AlBr_3$'s high solubility in non-polar solvents provides a strong driving force for selective removal of etched Al from the MAX phase surface. X-ray diffraction (XRD, FIG. 3) spectra of the crude media indicate an interlayer expansion (8.8°) and production of etched product (c.a. 20°-30°). X-ray photoelectron spectroscopy (XPS) analysis (FIG. 9, image A) of the yellow supernatant resolves only Al and Br (1:3 stoichiometric ratio) with no Ti-confirming selective etching at these conditions. A white precipitate ($Al_2O_3$) forms upon exposure of the supernatant to air, consistent with hydrolysis of the highly reactive $(AlBr_3)_x$ (see FIG. 4). Fourier-transform infrared spectroscopy (FTIR) analysis of the yellow supernatant reveals brominated cyclohexane ($C_6H_{11}Br$). Bromination of aliphatic solvents occurs via free radical processes, which typically require either catalytic or photonic activation of $Br_2$ homolysis, and produces HBr gas. FIG. 9, image B demonstrates $CH/Br_2$ halogenates only in the presence of UV-light (354 nm). Etch solutions run in the dark produce $C_6H_{11}Br$ and HBr strongly suggesting $Ti_3AlC_2$ surfaces act as catalysis sites for $Br_2$ homolysis.

These observations are consistent with a bromine radical etch of $Ti_3AlC_2$. Initially, $Br_2$ adsorption to exposed edges of the Al plane likely induces $Br_2$ homolysis. The generated radicals react with Al centers and solvent, accounting for all etched products observed (HBr, $AlBr_3$, $C_6H_{11}Br$). This mechanism can be further confirmed via consideration of MAX phase etching in different solvents. Homolysis requires polarization of the Br—Br bond, high di-electric solvents increase the reactivity of $Br_2$ via increasing Br—Br bond polarization, which expands the type of surface sites that may produce radicals (Br*). Table Si (below) and FIG.

5 confirm this trend, where $Br_2$ in high dielectric solvents, such as acetonitrile, react violently with $Ti_3AlC_2$, and result in $TiBr_x$ formation. Thus, selectivity is enhanced in non-polar solvents. It is likely that a similar halogen radical mechanism drives recently reported molten salt preparations, where thermal decomposition of transition metal halide salts result in formation of zerovalent transition metals and elemental halogens.

Figure 3:
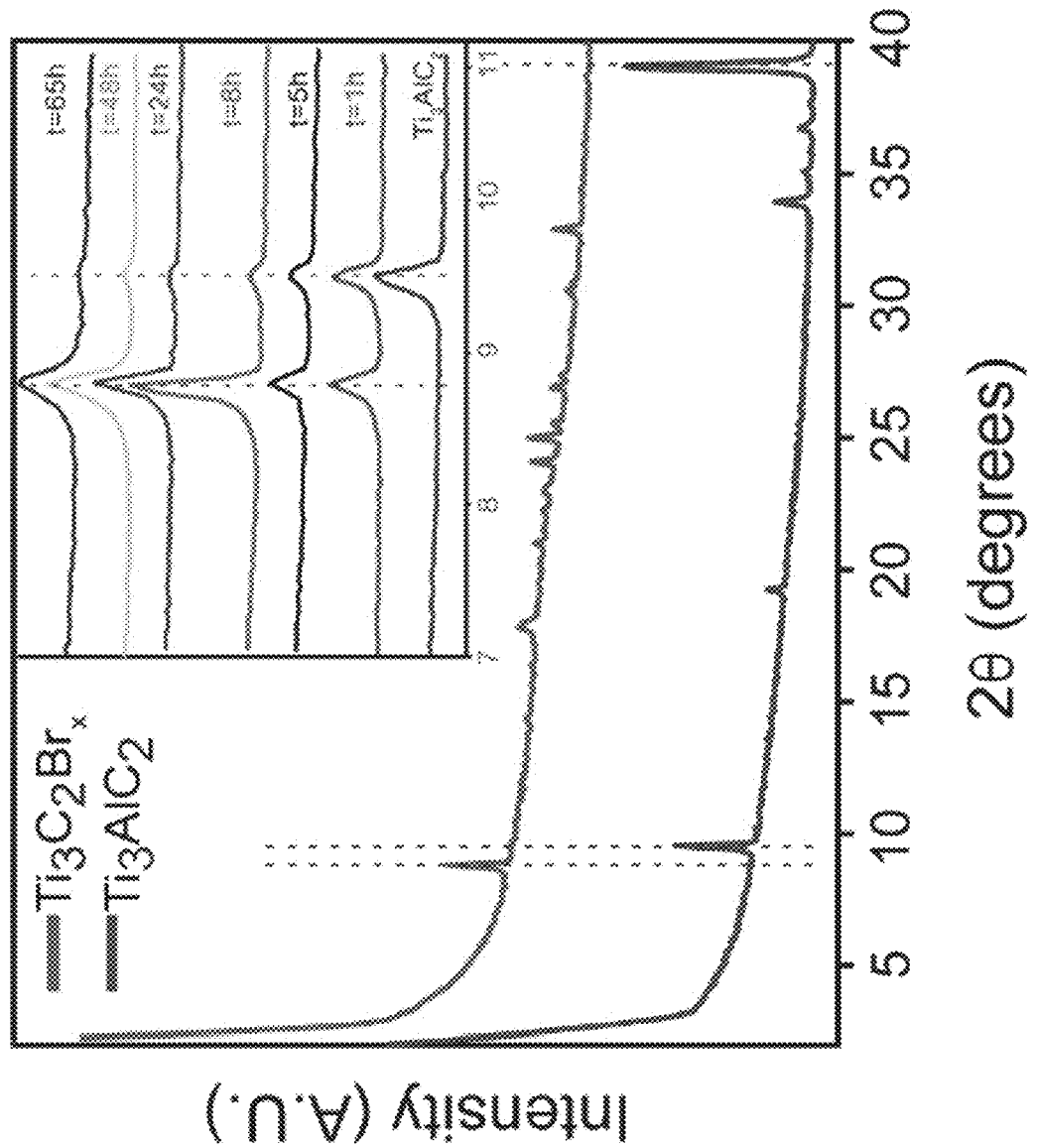
FIG. 3 presents XRD spectra of Ti$_3$AlC$_2$, and etched Ti$_3$AlC$_2$ in cyclohexane/Br$_2$ solution drop casted from the reaction mixture without any purification or centrifugation steps (red). Inset: crudes in the reaction medium are monitored over the course of ~3 days (65 hours). During this reaction period, the Ti$_3$AlC$_2$ interlayer reflection (9.4°) slowly attenuates while a new dominant interlayer space (8.8°) appears, indicating a new layered material corresponding to aluminum etched, Ti$_3$C$_2$Br$_x$.
Figure 4:
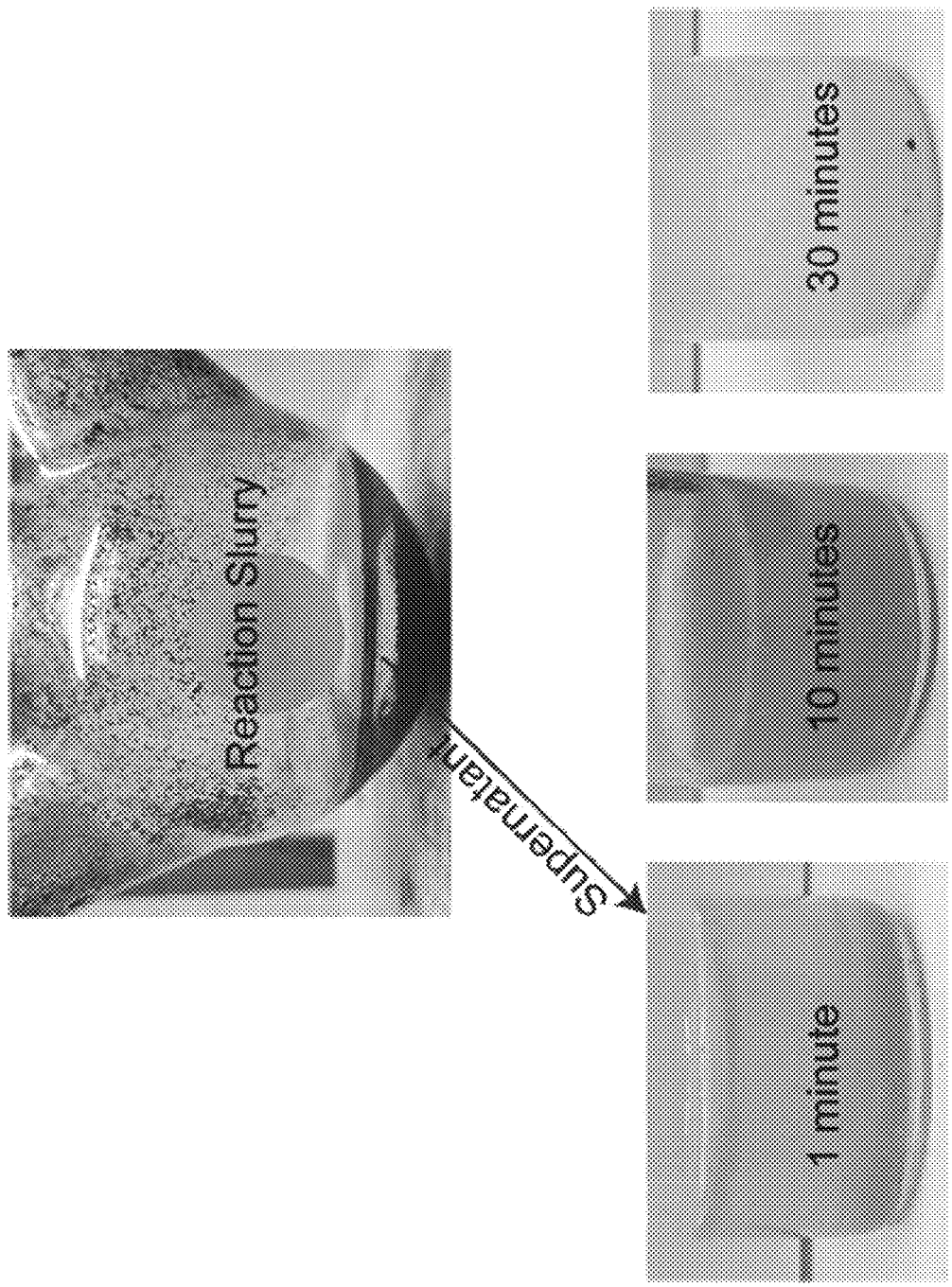
FIG. 4 presents an image of Ti$_3$C$_2$T$_x$ supernatant after isolating it from the reaction mixture (without the addition of TBAX) and exposing it to ambient conditions, which results in liberation of a colorless gas over the course of ~30 minutes. The solution transform from optically clear, yellow, to opaque yellow (precipitates form) and finally optically clear, colorless with a formation of a white precipitate.
Figure 5:
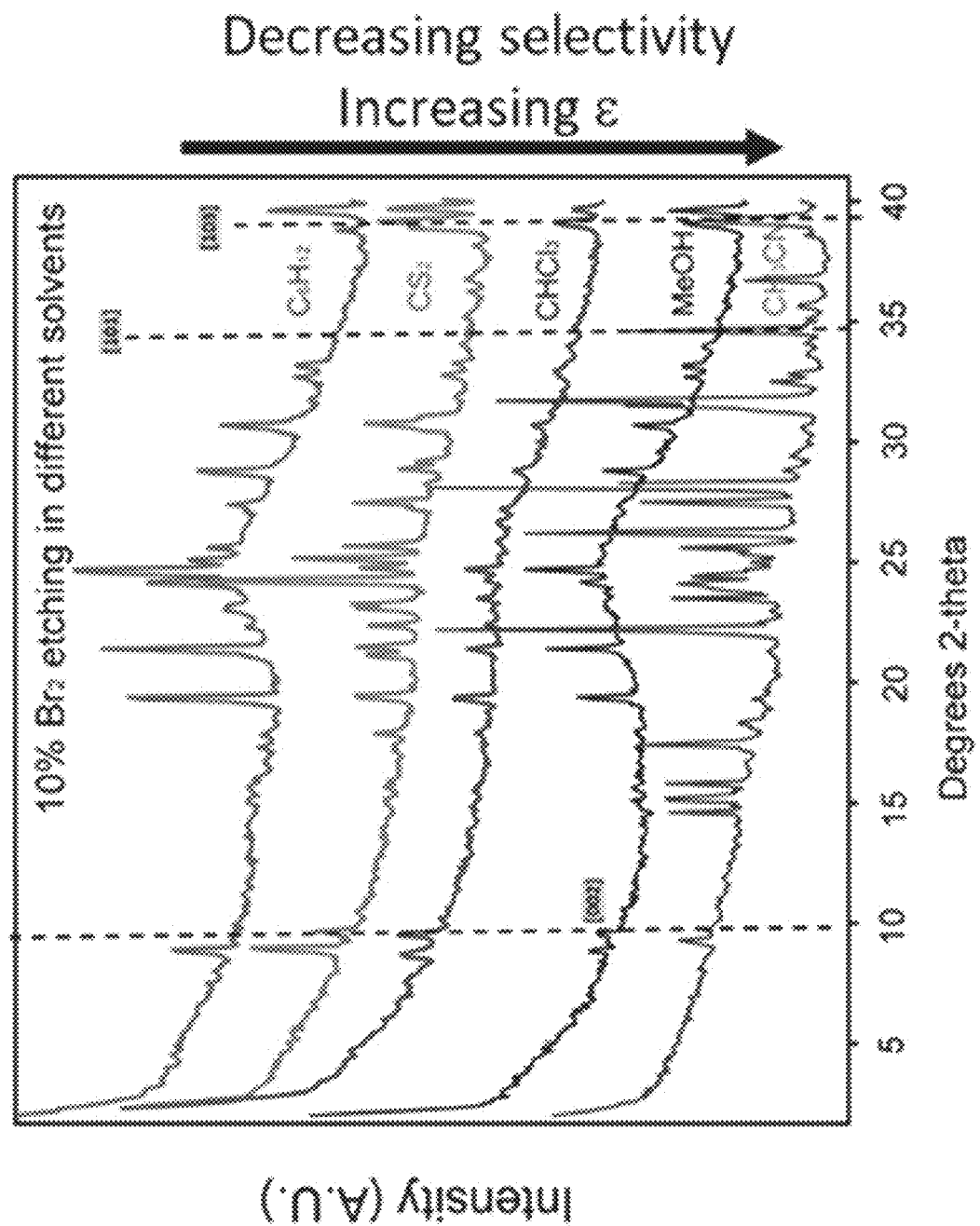
FIG. 5 depicts selectivity of Br$_2$ etch in various solvents (anhydrous, inert conditions). As the dielectric constant of the solvent increases, the reaction becomes increasingly less selective, where TiBr$_4$ species are formed in the most polar solvents, such as acetonitrile (2θ 13°-16°).
Figure 10:
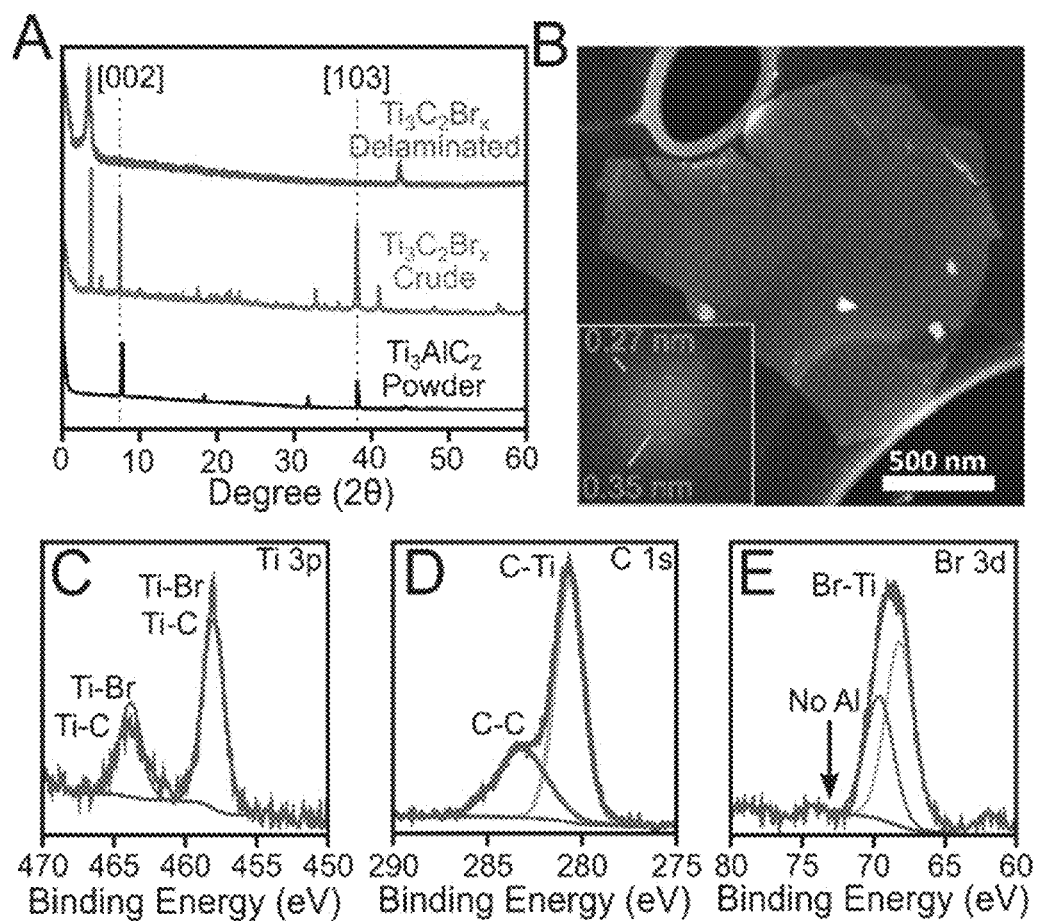
FIG. 10 presents structure and composition of Ti$_3$C$_2$Br$_x$. Image (A) presents XRD spectra of bulk Ti$_3$AlC$_2$ (black) and resulting crude (magenta) and purified (red) Ti$_3$C$_2$Br$_x$ synthesized with 10% Br$_2$/CH. The addition of TBAB to the crude enables separation of dispersed Ti$_3$C$_2$Br$_x$ flakes from the etch byproducts. Image (B) is a STEM image of a purified, exfoliated Ti$_3$C$_2$Br$_x$ MXene flake, and the inset presents an FFT of an HRTEM image (FIG. 11) revealing [110] (0.35 nm) and [200] (0.27 nm) lattice reflections. Images (C-E) present high-resolution XPS spectra of purified Ti$_3$C$_2$Br$_x$ flakes showing titanium (Ti 2p 454 eV); carbide (C is 281.5 eV); and Ti—Br (66-69 eV); and absence of Al (72-75 eV).
Figure 11:
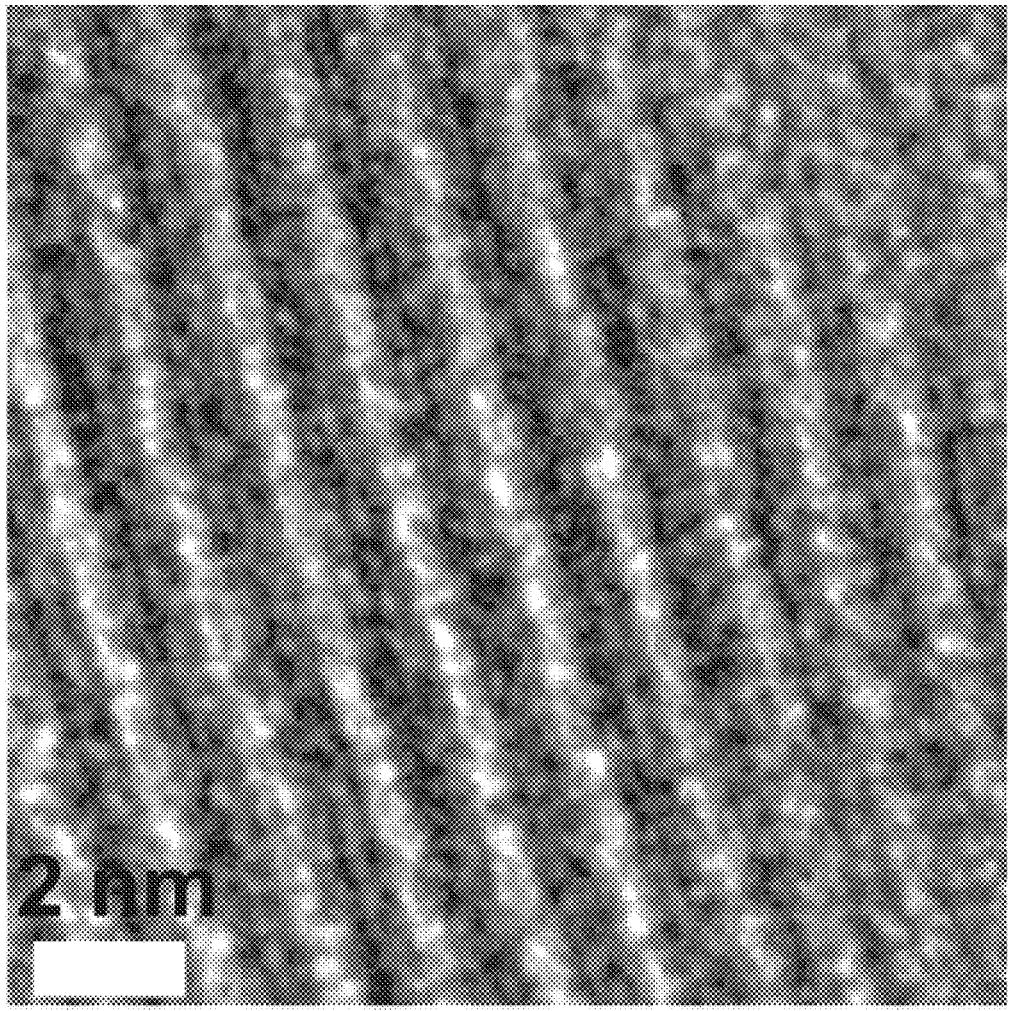
FIG. 11 presents an HRTEM image for the FFT pattern shown and described with respect to FIG. 10, image B.

(8.8°), and by-products such as, $Al_2O_3$, $(AlBr_3)_x$ (c.a. 20-30°). After purification (centrifugation), only $Ti_3C_2Br_x$ is present (FIG. 3, image A, red curve). The expansion of the $Ti_3C_2Br_x$ unit cell (d[002] $Ti_3AlC_2$=0.927 nm; d[002] $Ti_3C_2Br_x$=1.01 nm) is consistent with recent reports of $Ti_3C_2Br_x$ from molten $CdBr_2$. Transmission electron microscopy (TEM) show thin, two-dimensional flakes with minimal surface contamination (FIG. 10, image B). The in-plane

TABLE S1

A list of reaction landscape and optimal conditions needed for the etching of $Ti_3AlC_2$ using $Br_2$ in different solvents.

| Solvent | MAX phase Concentration (Molarity) | Optimal Etchant Concentration (vol %) | Optimal MAX:Etchant (mol:mol) | Optimal Temp (° C.) | Optimal Time (hrs) | Notes |
|---|---|---|---|---|---|---|
| $C_6H_{12}$ | 1 | 10 | 1:2 | ~25 | 8-24 | Supernatant light yellow at end point |
| $CS_2$ | 1 | 10 | 1:2 | ~25 | 8-24 | Supernatant light yellow at end point |
| $CHCl_3$ | 1 | 10 | 1:2 | ~50 | N/A | Supernatant still red after 48 hrs |
| $CH_3OH$ | 1 | 30 | 1:2 | ~25 | 48 | Supernatant yellow exposure to air results in acrid odor |
| $CH_3CN$ | 1 | N/A | N/A | N/A | N/A | Violently exothermic |

N/A indicates no selective etching is observed (i.e. no new interlayer peaks observed in XRD.)

Figure 6:
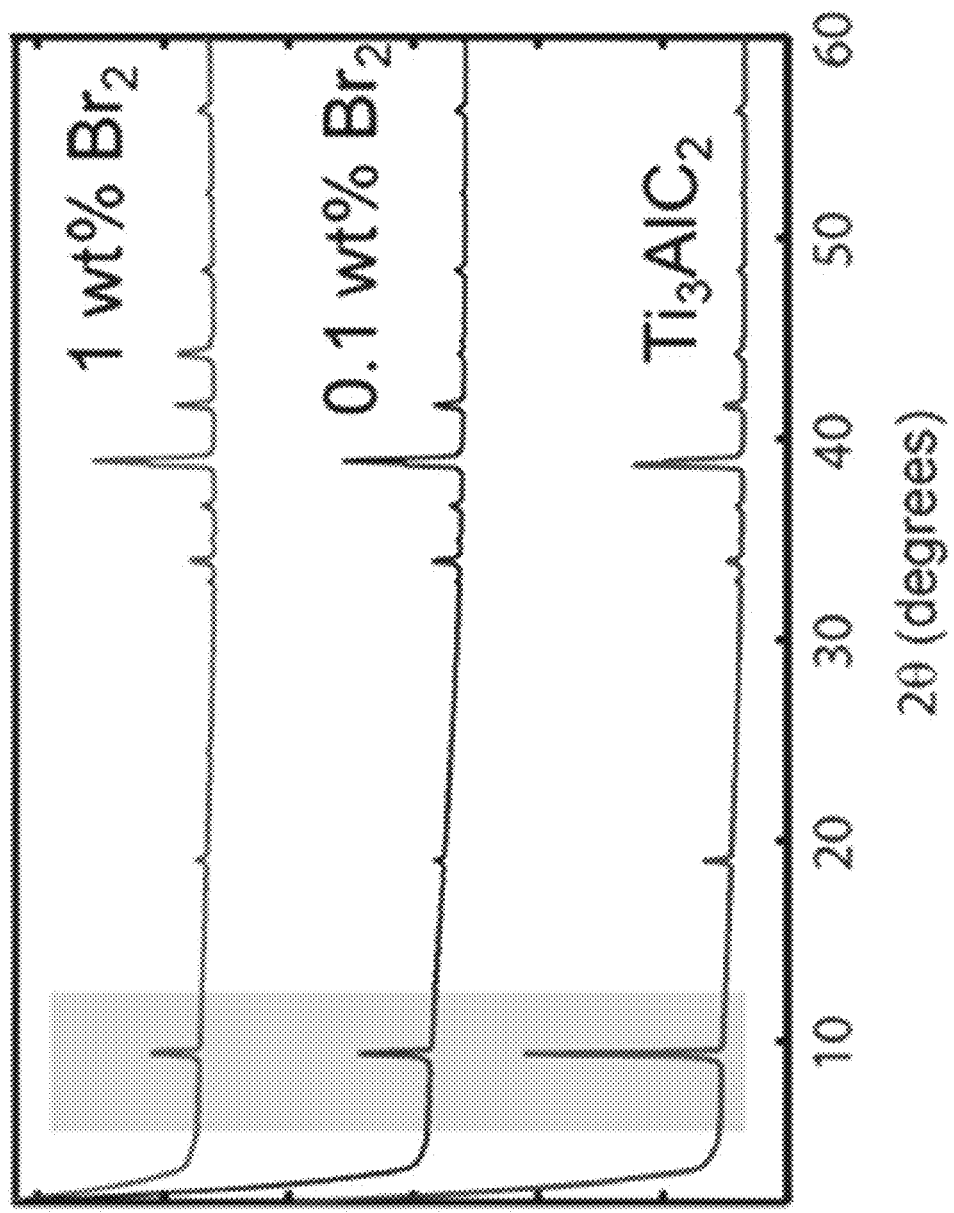
FIG. 6 presents XRD patterns of etching Ti$_3$AlC$_2$ at low Br$_2$ concentrations. No apparent changes in the MAX phase is observed, indicating etching does not occur at low loading concentrations.
Figure 7:
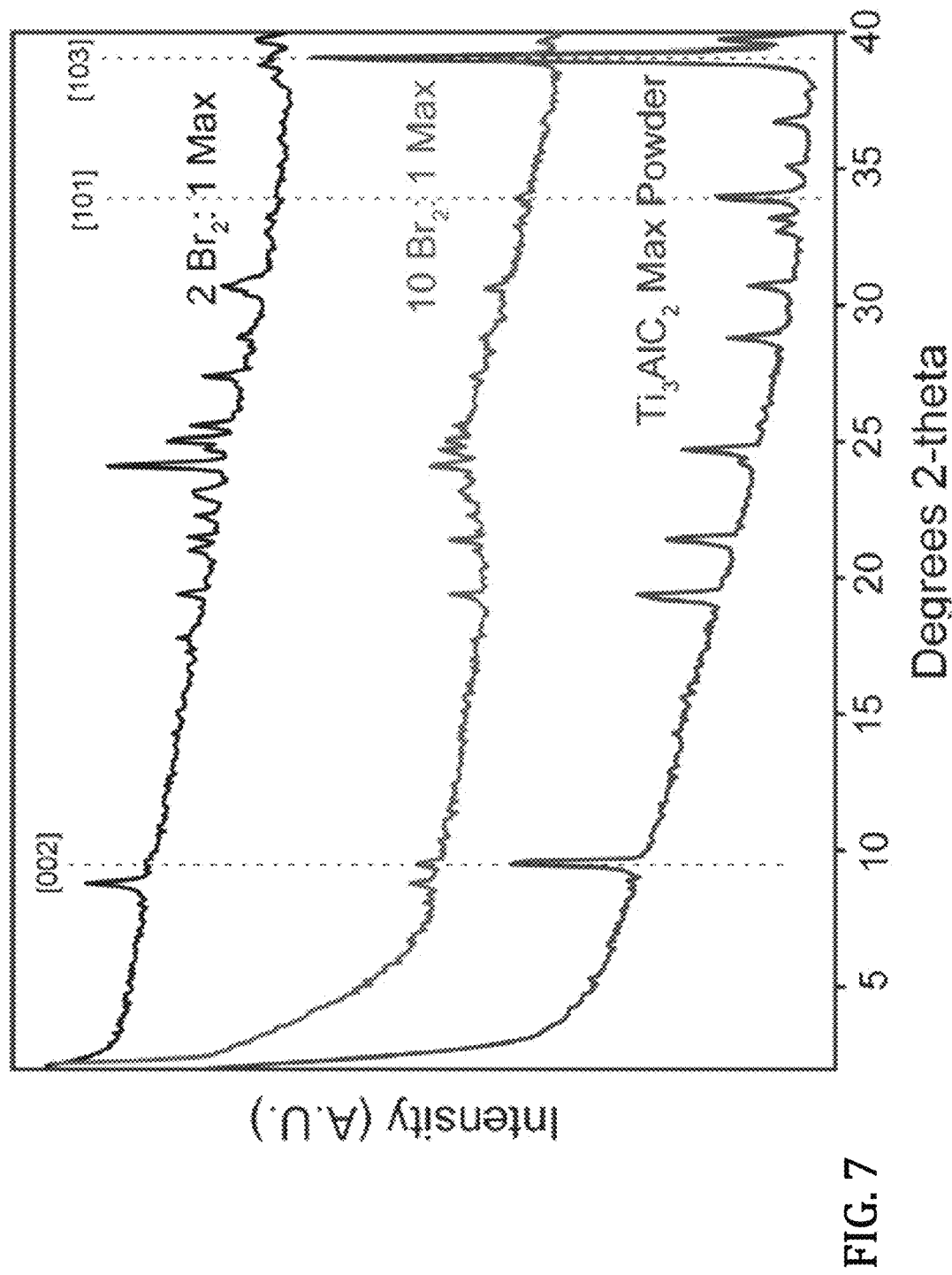
FIG. 7 presents XRD patterns of etching Ti$_3$AlC$_2$ at different loading ratios where the stoichiometry space is evaluated. At higher Br$_2$: MAX loading ratios (10:1), etching occurs, but is less efficient/effective than (2:1) loading ratios, where complete disappearance of the MAX [002], [101] and [103] peaks are observed for 2:1 loading ratios, but not 10:1.

Consistent with this mechanistic insight, the most effective etching conditions (rate and specificity) occur at intermediate $Br_2$ concentrations in cyclohexane. This is analogous to the parabolic concentration profile of silicon etching via $Br_2$ and $Cl_2$ at RT. For example, etching is optimized at ~10 vol % $Br_2$ using a slightly depleted stoichiometric molar ratio of MAX:$Br_2$ of 1:2 (Al:Br=1:4) relative to $Ti_3C_2Br_2$ and $AlBr_3$ products (FIG. 9, image C). Lowering $Br_2$ concentrations (0.1-1 vol %) reduces the etch rate (FIG. 6), due to lower local areal concentrations of $Br_2$ adsorbates. Conversely, increasing $Br_2$ concentration reduces effectiveness of the etch (FIG. 7). This is likely due to an increase of reactive species at the surface (e.g. Br* and $AlBr_3$) that reduces specificity via side reactions. For example, titanium bromides and amorphous carbon are formed at >10 vol % $Br_2$, and $Ti_3AlC_2$ reacts violently upon its addition to neat $Br_2$, yielding carbonaceous species only. These observations are consistent with etching of metalloid atoms (Ti, Si, etc.) from binary or ternary carbides via halogenation for carbon-derived carbide (CDC) synthesis.

Purification and isolation of $Ti_3C_2Br_x$ flakes (FIG. 2, image D) requires removal of $AlBr_3$ while inhibiting its spontaneous hydrolysis to aluminum oxides. Formation of $Al_2O_3$ on $Ti_3AlC_2$ and $Ti_3C_2T_x$ surfaces reduces etch rate and confounds purification. The former is similar to processes where an $Al_2O_3$ layer is employed to protect Al from $Cl_2$, $Br_2$ or glow discharge of these vapors. $AlBr_3$ cannot be volatilized at RT (BP 263° C.); however, it can be stabilized by complexation with an anion to form an inert, soluble, tetragonal $[AlBr_3X]^-R^+$ species, (FIG. 8). Tetrabutylammonium halides ($TBA^+X^-$; $X^-$=$F^-$, $Cl^-$, $Br^-$, $I^-$) do not interfere with Br* generation and can be added before or after the etch, yielding pristine, high quality MXene that are isolated by standard centrifugation separation in ambient (FIG. 2, image E).

Figure 12:
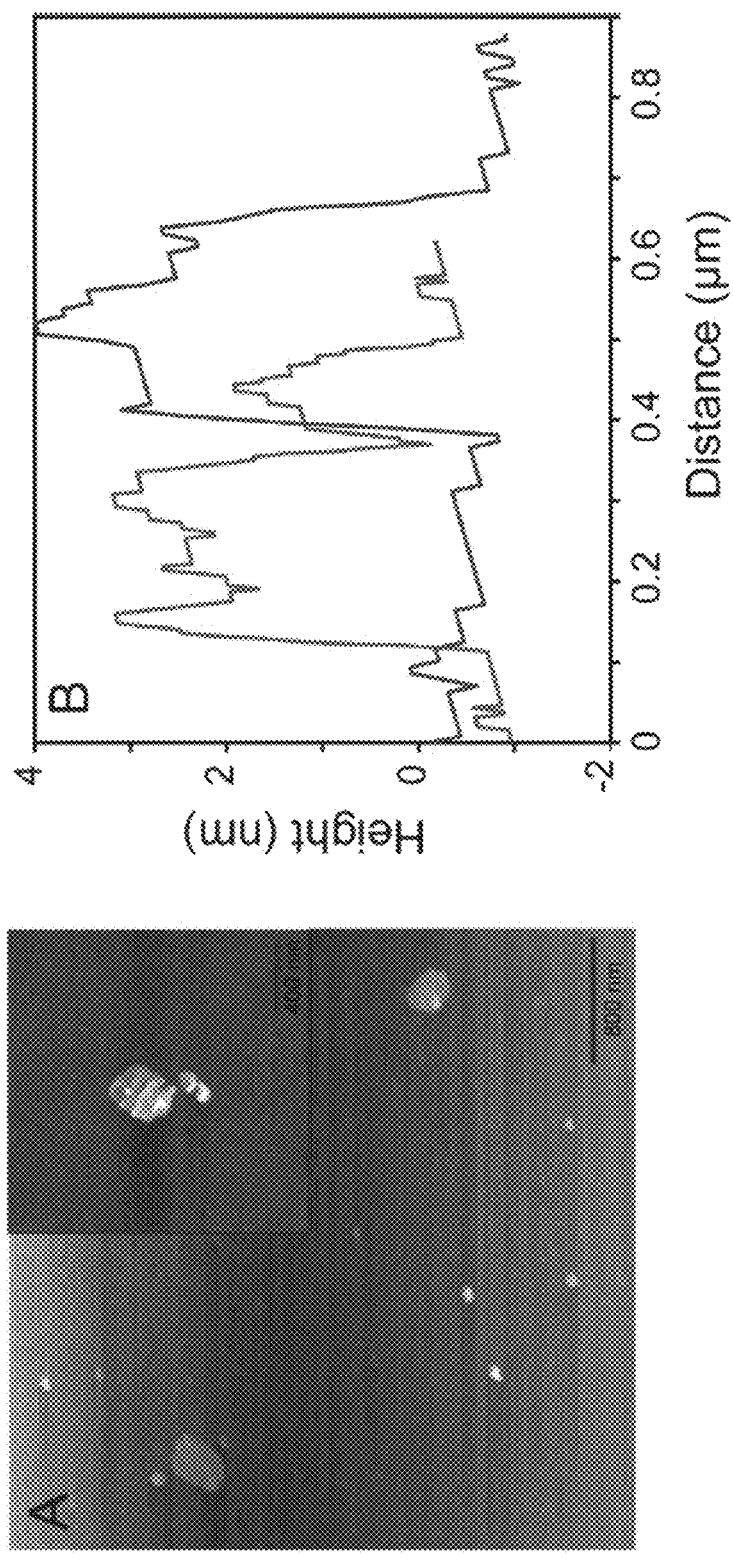
FIG. 12 presents (image A) AFM topography image of Ti$_3$C$_2$T$_x$ nanosheets (scale bar: 800 nm). Inset in image A is a zoom on a single sheet, with the associated scale bar: 400 nm. Image B presents a corresponding height profile.

FIG. 10 summarizes the final $Ti_3C_2Br_x$ MXene. XRD spectra indicates that the etched crude solution after the addition of TBAX, (FIG. 10, image A, black curve), contains a mixture of un-etched $Ti_3AlC_2$ powder (9.55°), $Ti_3C_2Br_x$, single crystal morphology is preserved ([200]=0.35 nm); indicating the structural integrity of the Ti—C backbone of the MXene is not damaged during the etching process. Compositional analysis of the purified MXene are consistent with halogenated surfaces (FIG. 10, images C-E, Table S2, below), with M:X composition of ~3:1, similar to molten salt approaches (c.a 3:1.5). Atomic force microscope (AFM) indicates ~2-3 nm thick sheets (FIG. 12), where surface adsorbates typically increase observed monolayer heights, as previously reported for other 2D systems.

TABLE S2

Quantitative results of XPS analysis obtained for $Ti_3C_2Br$ ($Ti_3C_{1.7}Br_{0.85}$) MXene and shown in FIG. 3 (C-E) in the main text. Results indicate a stoichiometric molar ratio of ~3:1 M/X.

| Atom | Concentration % | Ratio with respect to Ti | Number of mole |
|---|---|---|---|
| Ti | 46.5 | 1 | 3 |
| C | 25.8 | 0.55 | 1.7 |
| Al | Less than 1 | NA | NA |
| Br | 13.6 | 0.292 | 0.85 |
| $Ti_3C_{1.7}Br_{0.85}$ | | | |

Figure 13:
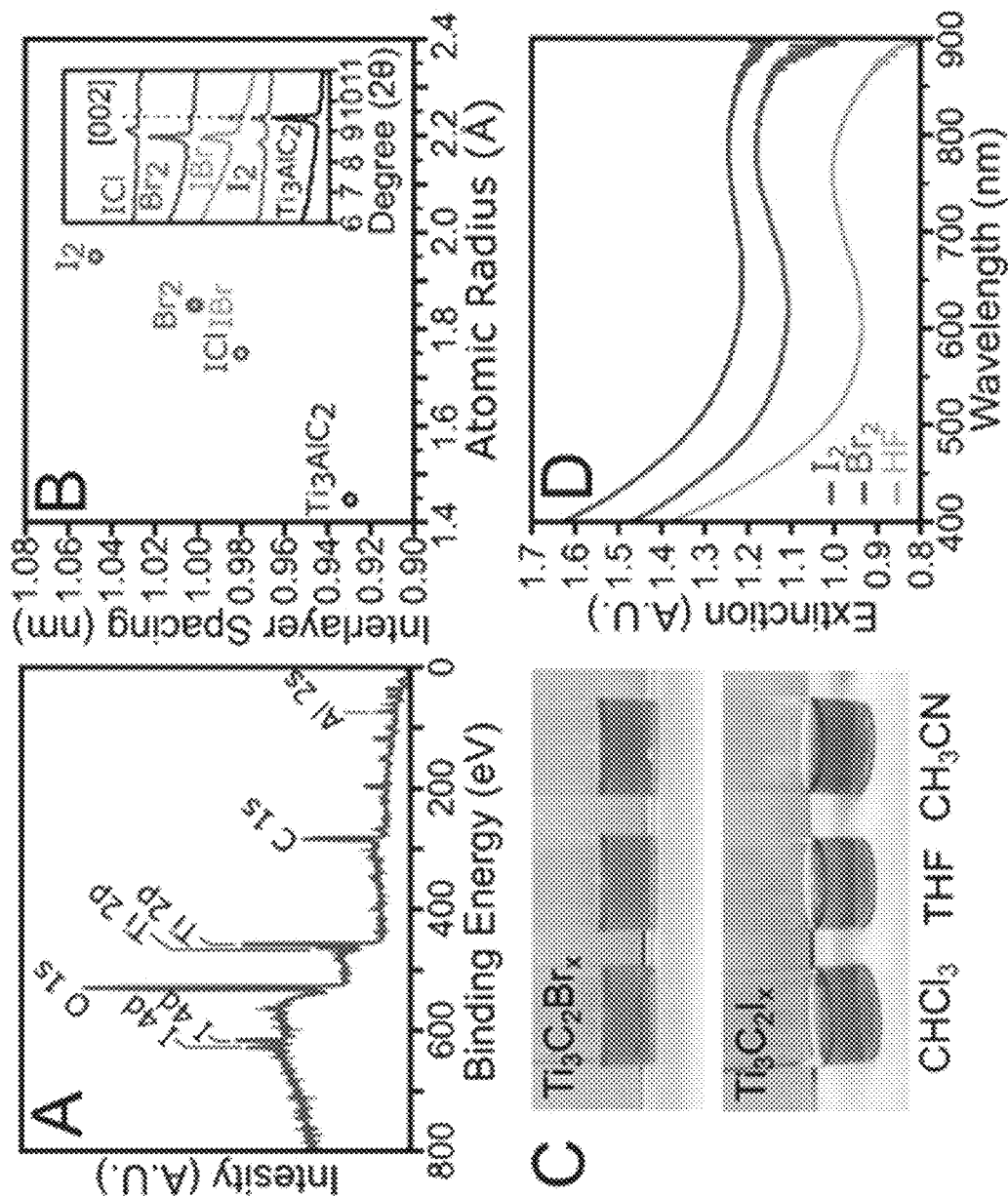
FIG. 13 presents halogen-etched MXenes. Image A presents an XPS of Ti$_3$C$_2$I$_2$ from a 10 vol % 12 in cyclohexane etch showing iodine, I 4d, signal, which indicates iodine-terminated surfaces. Image B presents interlayer spacing of Ti$_3$AlC$_2$ and various halogen-terminated MXenes. Layer spacing increases with atomic radius of halogen. Image C presents a photograph of stable colloidal suspensions of Ti$_3$C$_2$Br$_x$ (top) and Ti$_3$C$_2$I$_x$ (bottom) in various low-dielectric solvents. Image D is a comparison of the extinction of Ti$_3$C$_2$I$_x$ and Ti$_3$C$_2$Br$_x$ to conventional MILD etched Ti$_3$AlC$_2$ (Ti$_3$C$_2$T$_x$: T=F, OH, O) revealing a red-shift in the plasmonic resonance as the electronegativity of the surface termination decreases.

Halogen-based production of MXene extends beyond $Br_2$, due to the generality of halogen radical etch of metals and their alloys. FIG. 13 summarizes results using $I_2$ as well as inter-halogen etchants (ICl, IBr). For example, reactions utilizing $I_2$ are initially deep purple, and slowly turn light purple to colorless as the Al is removed. Due to iodine's larger atomic radius and endothermic homolysis relative to $Br_2$, higher temperatures are required (Table S3).

TABLE S3

A list of reaction landscape and optimal conditions needed
for the etching of $Ti_3AlC_2$ using $I_2$ in different solvents.

| Solvent | MAX phase Concentration (Molarity) | Optimal Etchant Concentration (vol %) | Optimal MAX:Etchant (mol:mol) | Temp (° C.) | Optimal Time (hrs) | Notes |
|---|---|---|---|---|---|---|
| $C_6H_{12}$ | 1 | 10 | 1:2 | Reflux ~70 | 8-24 | Supernatant light purple at end point |
| $CS_2$ | 1 | 10 | 1:2 | Reflux ~45 | 8-24 | Supernatant light purple at end point |
| $CHCl_3$ | 1 | N/A | N/A | Reflux ~50 | N/A | Supernatant deep purple after 48 hrs. no etching observed |
| $CH_3OH$ | 1 | N/A | N/A | Reflux ~60 | N/A | Supernatant deep red after 48 hrs, no etching observed |

N/A indicates no selective etching is observed (i.e. no new interlayer peaks observed in XRD)

The etch process results in the formation of $AlI_3$, which may also be removed by the addition of TBAX. XPS analysis of purified flakes reveal a composition ratio M:X of 3:2 ($Ti_3C_2I_2$), FIG. 13, image A, Table S4.

TABLE S4

Quantitative results of XPS analysis obtained for $Ti_3C_2I_2$
MXene Results indicates a stoichiometric molar ratio of ~3:2 M/X.

| Atom | Concentration % | Ratio with respect to Ti | Number of mole |
|---|---|---|---|
| Ti | 44.7 | 1 | 3 |
| C | 23.6 | 0.52 | 1.5 |
| Al | 3.14 | 0.072 | 0.2 |
| I | 28.5 | 0.64 | 1.91 |
| $Ti_3C_{1.5}I_{1.91}$ | | | |

Inter-halogens (e.g. ICl, IBr), which dissociate more readily than molecular halogens, also etch Al from $Ti_3AlC_2$, (Tables S5-S6).

TABLE S5

A list of reaction landscape and optimal conditions needed
for the etching of $Ti_3AlC_2$ using ICl in different solvents.

| Solvent | MAX phase Concentration (Molarity) | Optimal Etchant Concentration (Vol %) | Optimal MAX:Etchant (mol:mol) | Optimal Temp (° C.) | Optimal Time (hrs) | Notes |
|---|---|---|---|---|---|---|
| $C_6H_{12}$ | 1 | 10 | 1:2 | −78 | 8-24 | Supernatant light purple at end point |
| $CS_2$ | 1 | 10 | 1:2 | −78 | 8-24 | Supernatant light purple at end point |

TABLE S6

A list of reaction landscape and optimal conditions needed for the etching of $Ti_3AlC_2$ using IBr in different solvents.

| Solvent | MAX phase Concentration (Molarity) | Optimal Etchant Concentration (vol %) | Optimal MAX:Etchant (mol:mol) | Optimal Temp (°C.) | Optimal Time (hrs) | Notes |
|---|---|---|---|---|---|---|
| $C_6H_{12}$ | 1 | 10 | 1:2 | 25 | 8-24 | Supernatant light purple at end point |
| $CS_2$ | 1 | 10 | 1:2 | 25 | 8-24 | Supernatant light purple at end point |

The unit cell expansion can be approximated via removal of an Al radii and addition of two halogen radii (FIG. 13, image B and Table S7).

TABLE S7

A list of approximated d-spacing results based on unit-cell calculations compared to experimental observed XRD data, which showed to be in good agreement.

| Material | 2-theta approximation (Degrees) | 2-theta observed (Degrees) |
|---|---|---|
| $Ti_3AlC_2$ | 9.55 | 9.5 |
| $Ti_3C_2F_2$ | 9.20 | 9.1 |
| $Ti_3C_2Cl_2$ | 8.92 | 9.0 |
| $Ti_3C_2Br_2$ | 8.83 | 8.8 |
| $Ti_3C_2I_2$ | 8.48 | 8.4 |

For the inter-halogen compounds, the more electronegative halogen atom acts as the active etching species and terminates the surface (FIG. 13, image B). Overall these halogenated MXenes readily form stable colloidal suspensions in low dielectric organic solvents, including tetrahydrofuran, acetonitrile and chloroform, FIG. 13, image C. Finally, the surface plasmon resonance red shifts as the electronegativity of the surface termination decreases ($T_x$: F @ 757 nm; Br @ 780 nm; I @ 788 nm), FIG. 13, image D.

In summary, room-temperature, MAX phase homolysis of halogens provides a new, mild solution based method to generate MXenes with halogen terminated surfaces. The rate and extent of etching is monitored both qualitatively and optically due to a colormetric response, which provides direct quantitative feedback in contrast to the colorless, fluoride-based methods. Etch selectivity can be optimized based on halogen radical formation, and reactive by-products may be sequestered via addition of stabilizer salts. The resulting purified, halogenated MXenes are dispersible in common organic solvents (THF, $CH_3CN$), enabling unique MXene surfaces for post synthetic molecular hybridization. Halogen etch chemistry is likely tunable across a broad range of MAX compositions by careful choice of solvent, concentration, and temperature due to isostructural MAX phase bonding. Finally, the breadth of halogen surface termination opens exciting opportunities for widespread applications, as optical and electrical properties are a function of surface electron density.

Materials

All chemicals were used as received unless noted and all solvents were stored under activated molecular sieves (3 Å) to ensure anhydrous conditions. $Ti_3AlC_2$ MAX powder was purchased from Kai Kai Ceramics LTD. Liquid bromine ($Br_2$), iodine ($I_2$), iodine monobromide (IBr), and iodine monochloride (ICl), tetrabutylammonium halides (chloride, bromide, and fluoride), cyclohexane (>99%), chloroform (99%), THF (99.9%), acetonitrile (99%), $CS_2$ (99%), lithium fluoride, and hydrochloric acid were all purchased from Sigma-Aldrich.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

$Ti_2CTx$ MXene Synthesis

All reactions were carried out in a glove box in an inert atmosphere ($H_2O$ 0.3 ppm; $O_2$ 0.1 ppm). All solvents were dried and were allowed to stir at room temperature for 8 hours. Over the course of the reaction, heat is evolved and the color slowly disappears. At the end point, the crude supernatant is a light yellow, optically clear solution under activated molecular sieves (3 Ang). $Ti_3AlC_2$ Max phase was mixed with all different halogen in 1:2 molar ratio (Al:X=1:4). Note that ~1:8 ratio is used in traditional MILD and recently reported molten salts etching methods.

$Br_2$ etch: Into a glass vial was added $Ti_3AlC_2$ (5 mmol; 1.0 g) in 4.5 mL cyclohexane. Liquid bromine, $Br_2$, (10 mmol; 0.5 mL) was added in one portion and the slurry was allowed to stir at room temperature for 8 hours. Over the course of the reaction, heat is evolved and the deep red color slowly disappears. At the end point, the crude supernatant is a light yellow, optically clear solution.

$I_2$ etch: Into a glass vial was added $Ti_3AlC_2$ (5 mmol; 1 g) in 4.5 mL cyclohexane. Solid iodine, $I_2$, (10 mmol; 2.5 g) was added in one portion and the mixture was allowed to stir at 70° C. for 8 hours. Over the course of the reaction, heat is evolved and the deep purple color slowly disappears. At the end point, the crude supernatant is a light purple, optically clear solution.

ICl etch: Into a round bottom flask was added $Ti_3AlC_2$ (5 mmol; 1.0 g) in 4.5 mL $CS_2$. The solution was allowed to equilibrate in a dry ice bath (−78° C.). After equilibration (c.a. 15 minutes), liquid ICl (10 mmol; 0.5 mL) was added in one portion and the mixture was allowed to stir at −78° C. for 4 hours.

IBr etch: Into a round bottom flask was added $Ti_3AlC_2$ (1 mmol; 0.20 gram) in 4.5 mL $CS_2$. Solid IBr (2 mmol; 0.41 g) was added in one portion and the mixture was allowed to stir at room temperature for 8 hours. Over the course of the reaction, heat is evolved and the deep purple color slowly disappears. At the end point, the crude supernatant is a light purple, optically clear solution.

MILD Method: The etchant was prepared by dissolving 2.00 g (77.10 mmol) of LiF in 20.00 mL of 9.0 M HCl (180.0 mmol). 2.0 g (10.07 mmol) of $Ti_3AlC_2$ was gradually added over the course of 5 minutes and the reaction was allowed to stir for 24 hours. The mixture was then diluted to a total volume of 40 mL and centrifuged at 3500 rpm for 5 minutes for multiple cycles until pH 6 was achieved. After each cycle, the acidic supernatant was discarded and fresh deionized $H_2O$ was added. The suspension was then hand shaken for ~10 seconds before being centrifuged at 1000 rpm for seven cycles. After each cycle, the supernatant was extracted and fresh deionized $H_2O$ was added to the sediment. The combined extracted supernatant was vacuum filtered through 0.170 μm pore size filter paper and recollected in minimal deionized $H_2O$ (~15 mL) and used for further characterization. (See FIG. 13, image D)

Processing and Cleaning

Tetrabutylammonium bromide (TBAB) is added to the reaction mixture (0.2:1 by mol of MAX). The reaction supernatant in cyclohexane is extracted and centrifuged at 1000 RPM to sediment unexfoliated MAX phase and $AlBr_3Br$ and TBA by-product. The supernatant containing $Ti_3C_2T_x$ MXene flakes is collected and centrifuged again at 12000 RPM for 20 minutes. The supernatant is discarded and the centrifugation process is repeated two more times with the addition of fresh chloroform each time. Finally, the sediment containing $Ti_3C_2T_x$ MXene flakes is collected and suspended in a non-polar solvent (i.e. THF, $CH_3CN$) for further characterizations. Note that this method was equally effective with all other tetrabutylammonium halides (chloride and fluoride) tested.

Mechanism of $Br_2$ Etching Using FTIR

All samples were prepared as batch reactions in sealed glass vials and allowed to proceed for 8 hours at room temperature. In the first glass vial, 900 μL cyclohexane was mixed with 100 μL $Br_2$ and was kept in the dark. The second reaction, 900 μL cyclohexane was mixed with 100 μL $Br_2$ and kept under UV light (354 nm). The final reaction was carried out by adding $Ti_3AlC_2$ (1 mmol; 200 mg) in 900 μL cyclohexane followed by the addition of 2 mmol; 100 μL $Br_2$ and was kept in the dark. Note that ambient light is not a sufficient activator for radical formation, but we still ran the final reaction in the dark to prevent any possible light-induced radical formation. FIG. 9, images B-C reveals that etching proceeds via radical generation on the surface in a way that MAX surface acts to catalyze bromine hemolysis, which reacts with both solvent and MAX phase.

Microscopy and Spectroscopy

XRD patterns were recorded using a Smartlab system (Rigaku) with Cu Kα radiation (λ=0.15418 nm). UV-Vis spectra of exfoliated and cleaned samples were measured on a Cary 5000 spectrometer. Electron microscopy was performed on an aberration corrected FEI Talos TEM at an accelerating voltage of 200 kV. AFM measurements were performed on a Bruker Dimension Icon AFM of the surface morphology was measured in tapping mode using a Dimension Icon (Bruker Corporation). Standard AFM tips (Tap300AI-G, Budget Sensors) were used that contained an aluminum reflex coating with a resonant frequency of 300 kHz and a force constant of 40 N/m. Lateral and height profiles were obtained from AFM line scans of individual particles using NanoScope Analysis software (Bruker Corporation). XPS analysis was carried out using a Kratos AXIS Ultra spectrometer at high vacuum (~$2\times10^{-9}$ Torr) with a monochromated Al Kα radiation (1486.6 eV). Survey scans were collected at 10 mA and 10 kV with the electron analyzer operating in hybrid lens mode with an aperture of approximately 500 μm². High-resolution data was collected using analyzer pass energy of 20 eV and a step size of 0.1 eV. All data analysis utilized the CasaXPS software package.

According to another variation of the method, MAX phases ($M_3AlX_2$; $MAlX_2$; M=Transition metal; A=Al, Si; X=Carbon, Nitrogen) are added into a round bottom flask under rigorously anhydrous, inert conditions. The MAX phase powder is flamed dried under vacuum (50 mTorr) and back filled with water scrubbed ($CoSO_4$ desiccant) Argon gas. This was performed two times to ensure residual water is eliminated.

Using Bromine as the Active Etchant

To the dried MAX phase, doubly distilled methanol/$Br_2$ was added to create a 20 wt % $Br_2$ solution. The reaction is allowed to proceed for 24 hours typically at 35° C., during which a color change is observed (dark red to light yellow) indicating etching of Aluminum from the MAX phase. The reaction is monitored via wide angle x-ray scattering by drop-casting aliquots from the reaction slurry onto Si wafers. The intensity of the interlayer spacing of the MAX phase (i.e. 0.90 nm $Ti_3AlC_2$) slowly decreases while simultaneously a new interlayer spacing (1.05 nm for $Br_2$) is observed, indicating a new layered material corresponding to aluminum etched, $Ti_3C_2T_x$ (Tx=Br). The reaction is complete when the ratio of the previously described peak intensities remains constant, preferably with the disappearance of the MAX phase peak completely, indicating complete etching of the MAX phase to MX. The reaction slurry is extracted via addition of anhydrous chloroform, and centrifuged at 5000 RPM. The supernatant containing $AlX_3$ product is discarded, and fresh chloroform is added. This process may be repeated, e.g. 3 times. Finally, the slurry is suspended in a non-polar solvent (i.e. THF, $CHCl_3$, $CH_2Cl_2$, $CCl_4$, etc. . . . ) and centrifuged at 1000 rpm for 1 hour to sediment un-exfoliated MAX phase. The supernatant, containing $Ti_3C_2Tx$ MX-ene flakes is collected. Excess halogen may be extracted or quenched with Lewis bases, such as trimethylamine, and disposed of in solid waste as an inert charge-transfer salt complex. The $AlX_3$ compounds are air sensitive, thus stabilizers may be added to the reaction slurry, such as benzene or coordinating Lewis bases ($NR_3$) to prevent decomposition upon exposure to air. Alternatively, the slurry may be centrifuged at 12000 rpm under inert atmosphere, the supernatant decanted, containing excess halogen; $AlX_3$ and fresh solvent added to wash the sample, analogous to established nanomaterial wash/redispersion methods.

FIG. 14 presents a matrix of results when bromine was used as an etchant for $Ti_3AlC_2$. Solvents included cyclohexane, $CS_2$, $CHCl_3$, methanol, and $CH_3CN$. The initial solutions were deeply red colored. As the reactions proceeded, heat evolved and the $Br_2$ color (red) disappeared to yield an optically clear, yellow, or clear supernatant. A solution that stayed red indicated that the etching process had stopped. Reactions carried out in polar solvents resulted in uncontrolled etching. For example, in methanol the vessel, upon exposure to air, has an acrid odor, whereas in acetonitrile the reaction is violently exothermic, and the solvent began to boil after the addition of $Ti_3AlC_2$ to $Br_2$. N/A indicates that no selective etching was observed; i.e. no new interlayer peaks were observed in XRD (see FIGS. 15-17).

Figure 15:
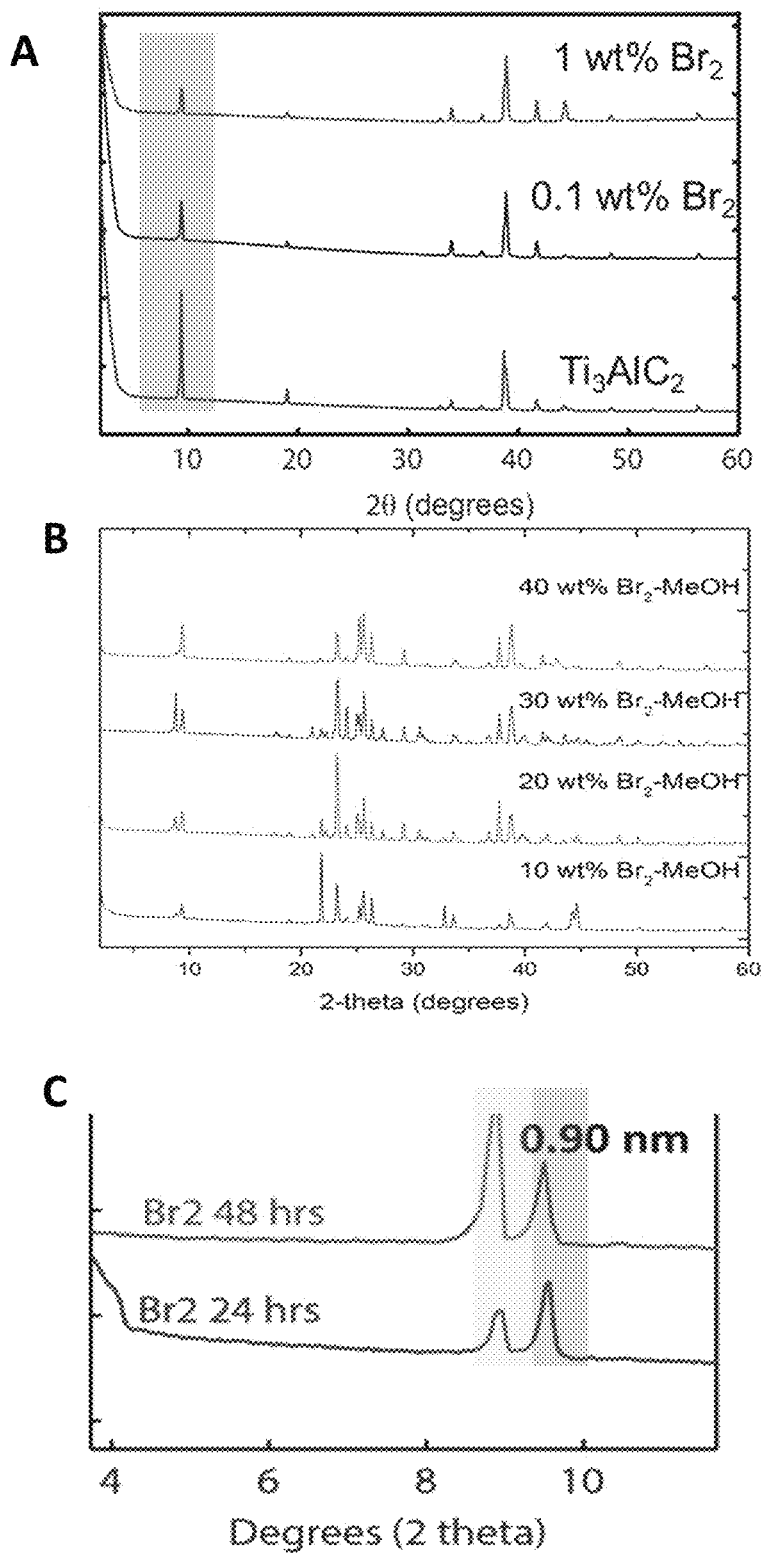
FIGS. 15-17 present examples of metrics for evaluating the values in FIG. 14.

FIG. 15 presents examples of metrics for evaluating the values in FIG. 14. $Ti_3AlC_2$ is loaded in varying $Br_2$ concentrations (0.1 wt %→40 wt %) in methanol. FIG. 14, image A, demonstrates no reaction is observed for loading ratios up to 1% $Br_2$. FIG. 14, image B, demonstrates the emergence of a new interlayer spacing, at concentrations of $Br_2$ from 10-40 wt %, and the maximum intensity of the peak is observed for 30 wt % $Br_2$. FIG. 14, image C demonstrates that carrying the reaction up to 48 hours results in an increase in the new etched interlayer spacing. 30 wt % Br$_2$ and 48 hours are optimal reaction conditions when methanol is the solvent.

Figure 16:
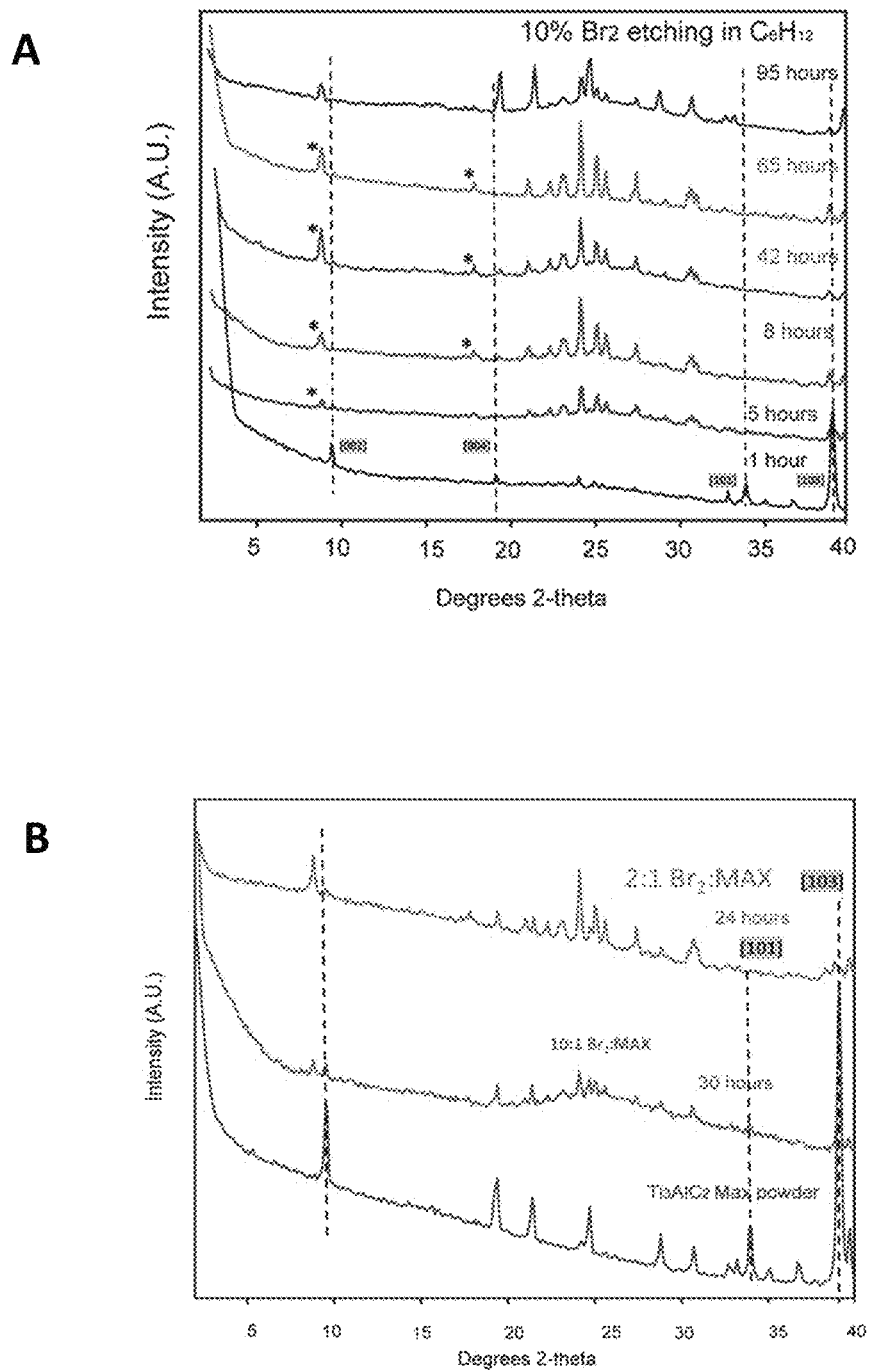
Figure 17:
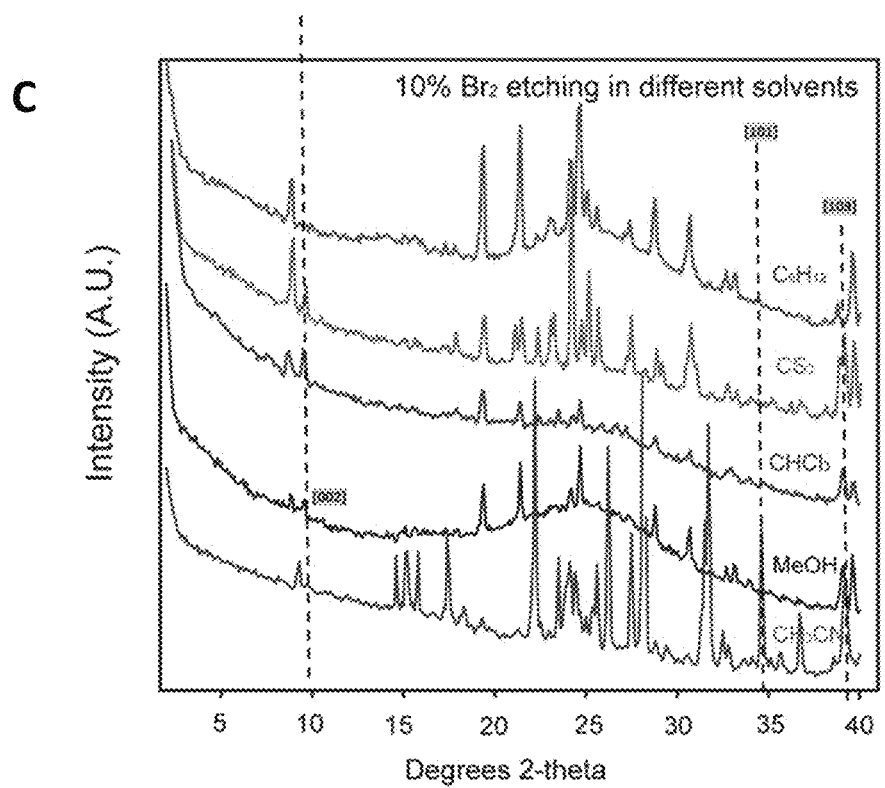

FIG. 16 presents example of metrics for evaluating the values in FIG. 14, wherein the Ti$_3$AlC$_2$/Br$_2$ etch is performed in cyclohexane solvent. FIG. 16, image A demonstrates assessments of the reactions, and results from aliquots of the reaction slurry being taken and drop-cast on Si wafers; the emergence of the new interlayer 002 series (indicated by *s) is monitored. This is accompanied by the disappearance of the [101] and [103] MAX phase peaks as a complimentary evaluation metric. FIG. 16, image B explores the stoichiometry space. From these metrics, at higher Br$_2$:MAX loading ratios (10:1), etching occurs, but is less efficient/effective than in the middle range loading ratios (2:1), where the complete disappearance of the MAX 002 peak (first dotted line) and MAX [101] and [103] are observed for 2:1 loading ratios, but not at 10:1. FIG. 17, image C demonstrates that, using the established metrics outlined in FIGS. 15-16, the efficiency of the reaction with different solvents is able to be monitored. In polar solvents (e.g. methanol, CH$_3$CN), MAX phase peaks are still present, while non-polar solvents such as CS$_2$ and cyclohexane indicate a more efficient etching process. Note: peaks at 15-18° in CH$_3$CN are indicative of titanium halide species, indicating non-specific etching. As the dielectric of the solvent decreases, the selectivity for etching the A interlayer increases.

Figure 18:
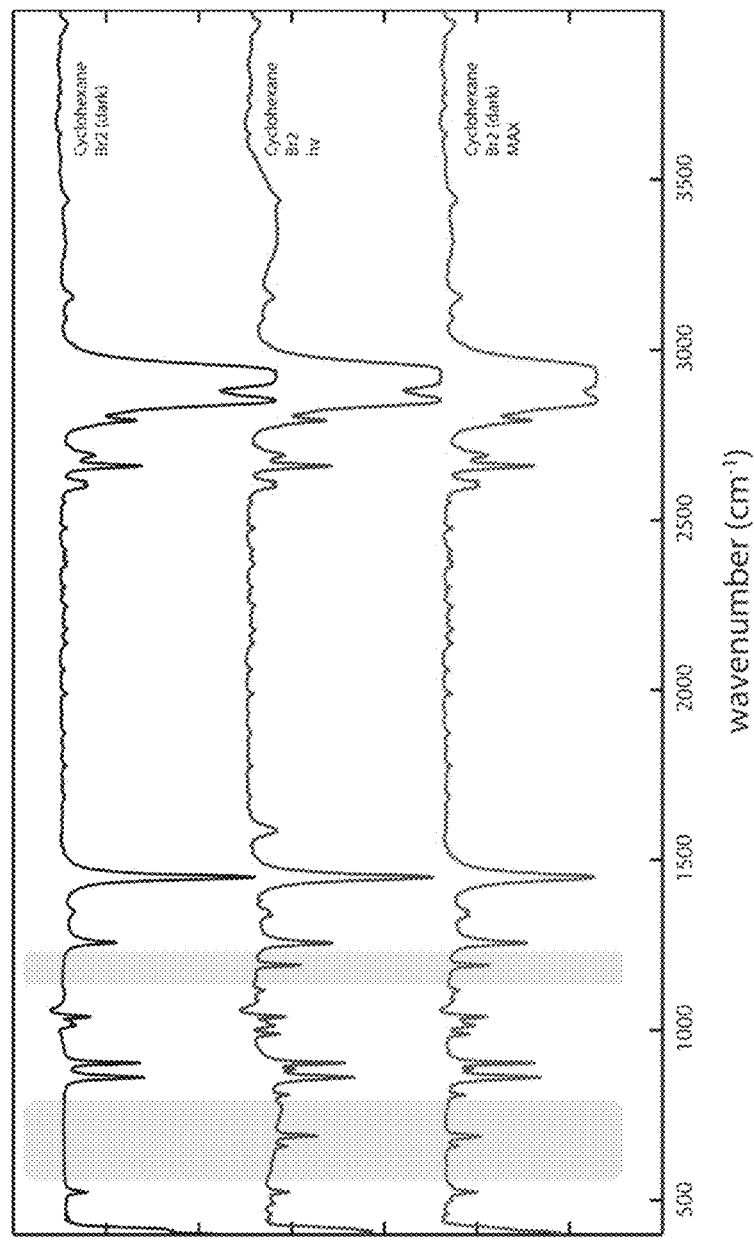
FIG. 18 presents FTIR spectra of the supernatant in comparison to UV-activated Br* halogenation of cyclohexane and unreactive cyclohexane (see also FIG. 9, Image B).

FIG. 18 illustrates the mechanism of Br$_2$ on MAX. Highlighted regions (left side of the graph) correspond to C$_6$H$_{11}$Br; C—Br bend (1220 cm$^{-1}$) and C—C—Br bend (850 cm$^{-1}$). The upper (black) trace presents C$_6$H$_{12}$+Br$_2$→NR (dark). The center (blue) trace presents C$_6$H$_{12}$+Br$_2$+hv→C$_6$H$_{11}$Br+HBr$_{(g)}$↑. The lower (red) trace presents C$_6$H$_{12}$+Br$_2$+Ti$_3$AlC$_2$→C$_6$H$_{11}$Br+HBr+Ti$_3$C$_2$Br$_2$+HBr$_{(g)}$↑. With regard to the use of bromine as an etchant, the MAX surface acts to catalyze bromine homolysis, which reacts with the solvent and MAX phase. Br* radicals produce AlBr$_3$ products, brominated solvent, and HBr gas.

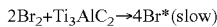

2Br$_2$+Ti$_3$AlC$_2$→4Br*(slow)     1

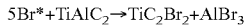

5Br*+TiAlC$_2$→TiC$_2$Br$_2$+AlBr$_3$     2a.

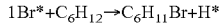

1Br*+C$_6$H$_{12}$→C$_6$H$_{11}$Br+H*     2b.

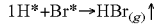

1H*+Br*→HBr$_{(g)}$↑     2c.

Etching Proceeds Via Radical Generation ON Surface

Polar solvents result in non-selective etching as Br* likely reacts with carbon and titanium centers on MAX phase (see previous slide with CH$_3$CN etching). FIGS. 19-20 present images regarding the characterization of MXenes etched with Br$_2$. FIG. 19, upper image, presents the initial appearance of MAX (1 mmol), with Br$_2$ (2 mmol), and Cyclohexane (1 mL; 10% Br$_2$ concentration), and the center image presents the appearance after about 8 hours at room temperature (RT). After about 8 hours, the contents (lower image) were centrifuged, decanted, and redispersed three times.

FIG. 20 presents STEM images of a purified, exfoliated Ti$_3$C$_2$Br$_x$ MXene.

Alternatively, the reaction may be conducted with iodine as the active etchant.

To the dried MAX phase, doubly distilled methanol/I$_2$ was added to create a 20 wt % I$_2$ solution. The reaction is allowed to proceed for 24 hours at 60° C., during which a color change is observed (deep purple to light red) indicating etching of aluminum from the MAX phase. The elevated temperature for utilizing I2 can be reasoned both geometrically and from general reactivity trends. For larger, bulkier halogens, penetration into the interlayer will be slower, requiring elevated temperature. Again, the reaction is monitored via wide angle x-ray scattering by drop-casting aliquots from the reaction slurry onto Si wafers. The intensity of the interlayer spacing of the MAX phase (i.e. 0.90 nm Ti$_3$AlC$_2$) slowly decreases while simultaneously a new interlayer spacing (1.1 nm for I$_2$) is observed, indicating a new layered material corresponding to aluminum etched, Ti$_3$C$_2$Tx (Tx=I). The reaction is complete when the ratio of the previously described peak intensities remains constant, preferably with the disappearance of the MAX phase peak completely, indicating complete etching of the MAX phase to MX. The reaction slurry is extracted via addition of anhydrous chloroform, and centrifuged at 5000 RPM. The supernatant containing AlX$_3$ product is discarded, and fresh chloroform is added. This process is repeated 3 times. Finally, the slurry is suspended in a non-polar solvent (i.e. THF, CHCl$_3$, CH$_2$Cl$_2$, CCl$_4$, etc. . . . ) and centrifuged at 1000 rpm for 1 hour to sediment un-exfoliated MAX phase. The supernatant, containing Ti$_3$C$_2$Tx MXene flakes is collected. Excess halogen can be extracted or quenched with Lewis bases, such as trimethylamine, and disposed of in solid waste as an inert charge-transfer salt complex. The AlX$_3$ compounds are air sensitive, thus stabilizers may be added to the reaction slurry, such as benzene or coordinating Lewis bases (NR$_3$) to prevent decomposition upon exposure to air. Alternatively, the slurry may be centrifuged at 12,000 rpm under inert atmosphere, the supernatant decanted, containing excess halogen; AlX$_3$ and fresh solvent added to wash the sample, analogous to established nanomaterial wash/redispersion methods.

Similar to FIG. 14, FIG. 21 presents a matrix of results when iodine was used as an etchant for Ti$_3$AlC$_2$. Solvents included cyclohexane, CS$_2$, CHCl$_3$, and methanol. Quantitative metrics were obtained in same fashion as the Br$_2$ data.

Qualitative metrics: the initial solution is deeply colored (purple). As the reaction proceeds, heat is evolved and the I$_2$ color (purple) disappears to yield an optically clear, light purple supernatant. Elevated temperatures are required for I$_2$ as an etchant due to the reduced reactivity compared to Br$_2$, likely due to the endothermic nature of I$_2$ homolysis (i.e. I$_2$→2I* ΔH>0). Solutions that are still deep purple indicate that the etching process stops. Reactions in polar solvents (methanol/ethanol) are deep red in color, as iodine coordinates to R—OH groups. Limited reactivity occurred in alcoholic solvents.

FIG. 22 presents ICl as an etchant for Ti$_3$AlC$_2$. Due to the limited reactivity of elemental halogens (I$_2$ and Br$_2$) in polar solvents, only non-polar solvents were explored for interhalogens. For ICl, due to the formation of Cl$_2$ gas, the reaction was cooled to −78° C. (dry ice) and the Cl$_2$ gas formed was refluxed for 24 hours using a cold finger after the reaction.

FIG. 23 presents IBr as an etchant for Ti$_3$AlC$_2$. IBr was treated identically to Br$_2$ in FIG. 14 (above). The reactions proceeded similarly to the Br$_2$ reactions.

Figure 24:
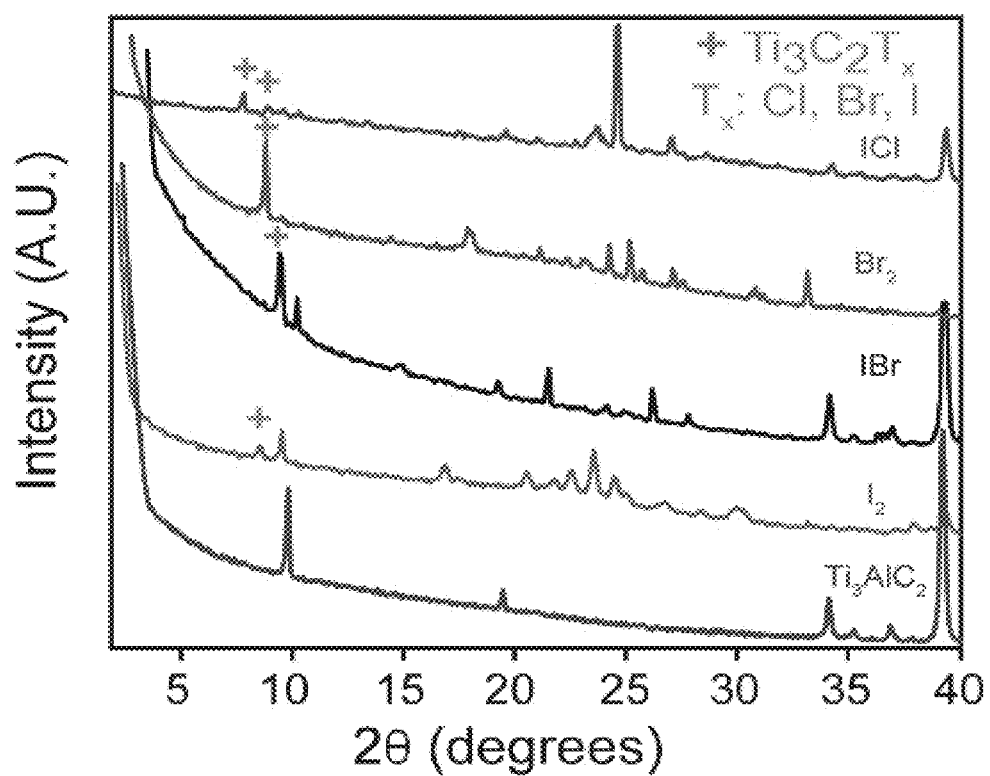
FIG. 24 presents a matrix and a graph demonstrating that the change in interlayer spacing is a direct indication that a new layered material is generated.

FIG. 24 presents a matrix and a graph demonstrating that the change in interlayer spacing is a direct indication that a new layered material is generated. As the halogen radius increases (Br→I), the new interlayer spacing also increases, indicating halogen terminated surfaces are present.

The reaction may also be carried out in non-polar, non-coordinating solvents (CS$_2$, CHCl$_3$, cyclohexane, benzene) with an addition of stabilizer. While AlX$_3$ species are easily solved in these solvents, the hexavalent species is likely unstable; fragmentation, dimerization, oxidation, or disproportionation can occur which poisons the etching by contaminating the MAX surface. Stabilizers include the addition of non-nucleophilic, coordinating Lewis bases ($R_3N$, R; 3 aliphatic groups).

Solvents that are incompatible with this etchant process include coordinating ethers (THF, $Et_2O$, dioxane) due to their ability to form halogen-solvent complexes, reducing the oxidative and etching strength of the halogen. Additionally, dispersants such as dimethyl-formamide, n-methyl pyrrolidone, or other similar amides are incompatible due to the ability of halogens to add across the amide functional group.

For MAX type phases, the M-X bonding is strong while the bonding along the M-A planes is weaker and allows for preferential bond cleavage given appropriate chemical reagents. Due to the strong etching potential of $X_2$ etchants, heterolytic cleavage of M-A bonds can be accomplished by introduction of elemental halogens. The mechanism proceeds via surface adsorption of the halogen, insertion of halogen between the labile M-A bonds, and liberation of $AlX_3$ species (X=Br, I) which is subsequently shuttled away from the material surface by the solvent. From this mechanism, the absolute concentration of halogen needs to be maintained above a certain threshold (determined ~10% for $Br_2$), the aluminum halide product needs to be soluble, stable, and shuttled away from the MAX surface in the solution phase. Precipitation or poor solubility of $AlX_3$ species results in etch poisoning due to surface oxide contamination. Due to the reactivity of $AlX_3$ compounds, reactions must be kept in strictly anhydrous conditions to avoid potential oxidation of the soluble, etched product or undesirable polyhalide formation. When these conditions are met, preferential etching of MAX phases occurs in both polar (alcohols) and non-polar (cyclohexane, $CS_2$) solvents with the addition of elemental halogens, or in-situ elemental halogen generation.

Experimental

Halogen Etch Procedures:

All reactions were carried out in a glove box in an inert atmosphere ($H_2O$ 0.3 ppm; $O_2$ 0.1 ppm). All solvents were dried under activated molecular sieves (3 Ang).

$Br_2$ etch:

Into a glass vial was added $Ti_3AlC_2$ (1 mmol; 200 mg) in 900 μL cyclohexane. Liquid bromine (2 mmol; 100 μL) was added in one portion and the slurry was allowed to stir at room temperature for 8 hours. Over the course of the reaction, heat is evolved and the deep red color slowly disappears. At the end point, the slurry supernatant is a light yellow, optically clear solution.

Processing and Cleaning

The reaction slurry supernatant in cyclohexane is extracted and centrifuged at 1000 RPM to sediment unexfoliated MAX phase. The supernatant containing $AlX_3$ product and $Ti_3C_2Tx$ MX-ene flakes is collected and centrifuged again at 12000 RPM for 20 minutes. The supernatant containing $AlX_3$ product is discarded and fresh cyclohexane is added. The centrifugation process is repeated two more times with the addition of fresh cyclohexane each time. Finally, the sediment containing $Ti_3C_2Tx$ MXene flakes is collected and suspended in a non-polar solvent (i.e. THF, $CHCl_3$) for further characterization.

$I_2$ Etch:

Into a glass vial was added $Ti_3AlC_2$ (1 mmol; 200 mg) in 900 μL cyclohexane. Solid Iodine (2 mmol; 0.5 g) was added in one portion and the slurry was allowed to stir at 60° C. for 8 hours. Over the course of the reaction, heat is evolved and the deep purple color slowly disappears. At the end point, the slurry supernatant is a light purple, optically clear solution.

ICl Etch:

Into a round bottom flask was added $Ti_3AlC_2$ (5 mmol; 1 gram) in 4.5 mL $CS_2$. The solution allowed equilibrating in a dry ice bath (−78° C.). After equilibration (c.a. 15 minutes), liquid ICl (10 mmol; 0.5 mL) was added in one portion and the slurry was allowed to stir at −78° C. for 8 hours (4 hours).

Further examples of the inventive method are presented in FIGS. 26-33.

FIG. 25 illustrates iodine as an etchant.

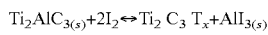

$Ti_2AlC_{3(s)} + 2I_2 \leftrightarrow Ti_2C_3T_x + AlI_{3(s)}$ is expected to react in a ~1:2 ratio MAX: $I_2$ FIG. 25 (upper image) demonstrates that the slow addition of $I_2$ to MAX phase in $CS_2$/MeOH results in equilibria forming, and iodine being consumed. The MAX phase slowly swells, and the XRD of all powders look identical.

FIG. 25 (bottom image) presents that after 24 hours, the MAX phase coats the glass vessel and the reaction stops. This is after ~0.25 mmol $I_2$ is added to 1 mmol MAX, which is much below the expected 2:1 ratio. The addition of more $I_2$ results in no further reaction (i.e. the red color develops and remains consistent) MAX powder coats glass vessel and poor contact w/ etchant solution results in termination of reaction. As presented in FIG. 26 (upper image), drying the supernatant results in a yellowish precipitate, consistent with $AlI_3·6H_2O$. Note: $Br_2$ reaction (etching with $Br_2$ instead of $I_2$) results in white precipitate, consistent with $AlBr_3$. FIG. 26 (bottom image) demonstrates that EDS resolves aluminum species, and no Ti (appears at ~5 keV).

FIG. 27 presents a table with seven different combinations of etchant (i.e. $I_2$, $Br_2$) and solvent (i.e. $CS_2$, MeOH) and different $X_2$:$Ti_3AlC_2$ ratios and wt % of $X_2$. The results for each combination are presented to the right of the table. It was found that a minimum amount of $X_2$ is required to etch out MAX phase. It was found that a minimum of a 1:1 ratio works for this purpose.

Figure 28:
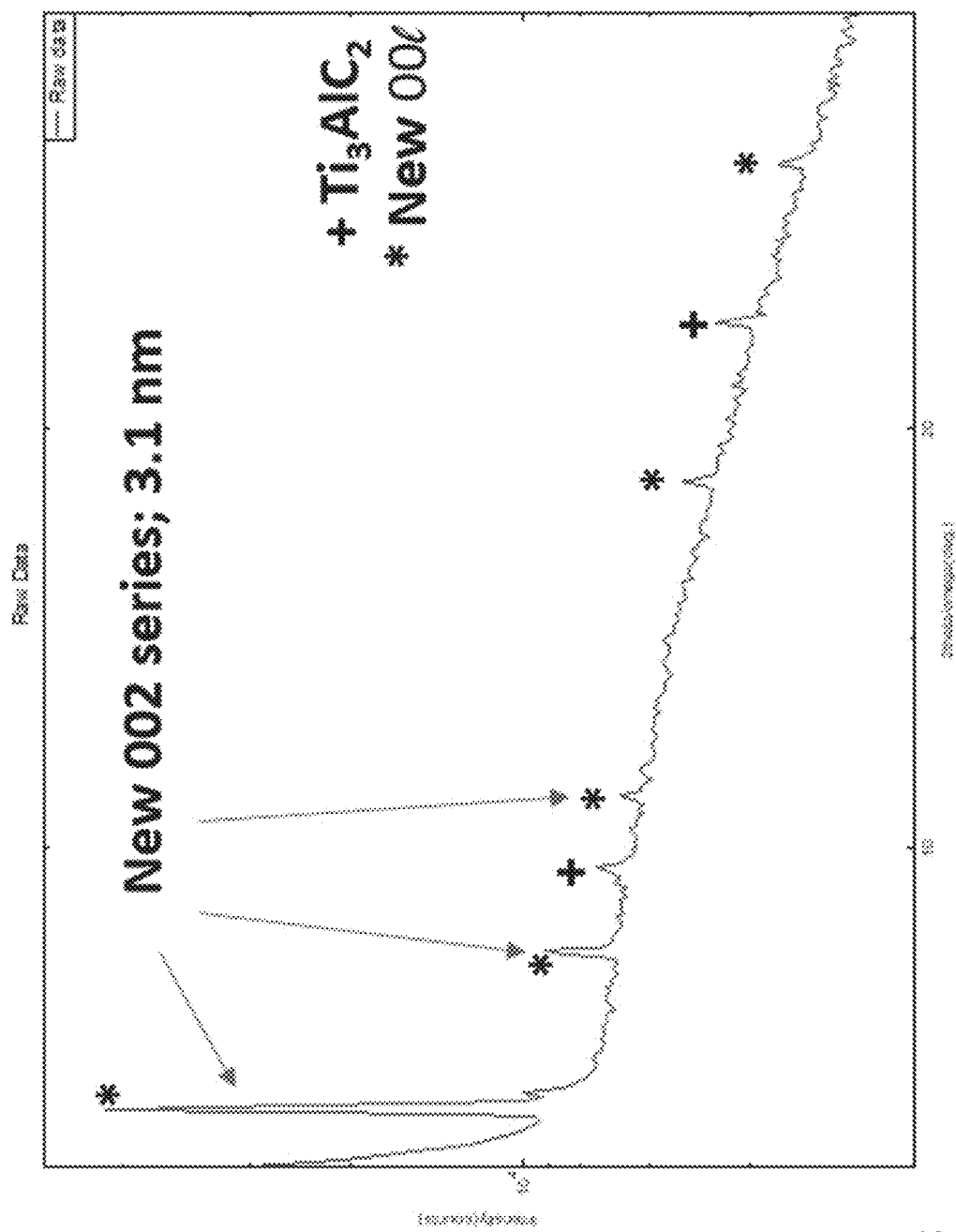
Figure 29:
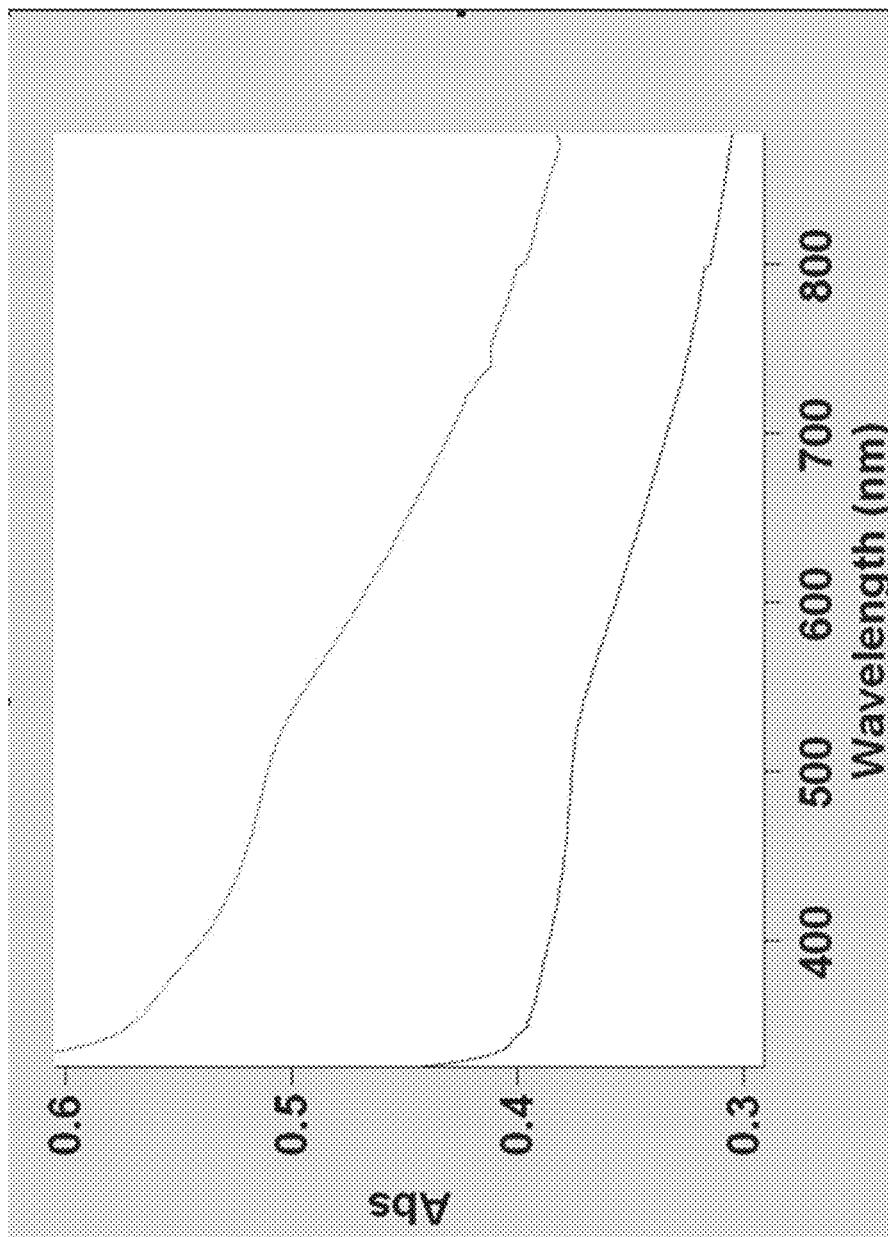

FIGS. 28-30 present structure and UV-Vis analysis of $I_2$ etched $Ti_3AlC_2$ in $CS_2$.

Figure 31:
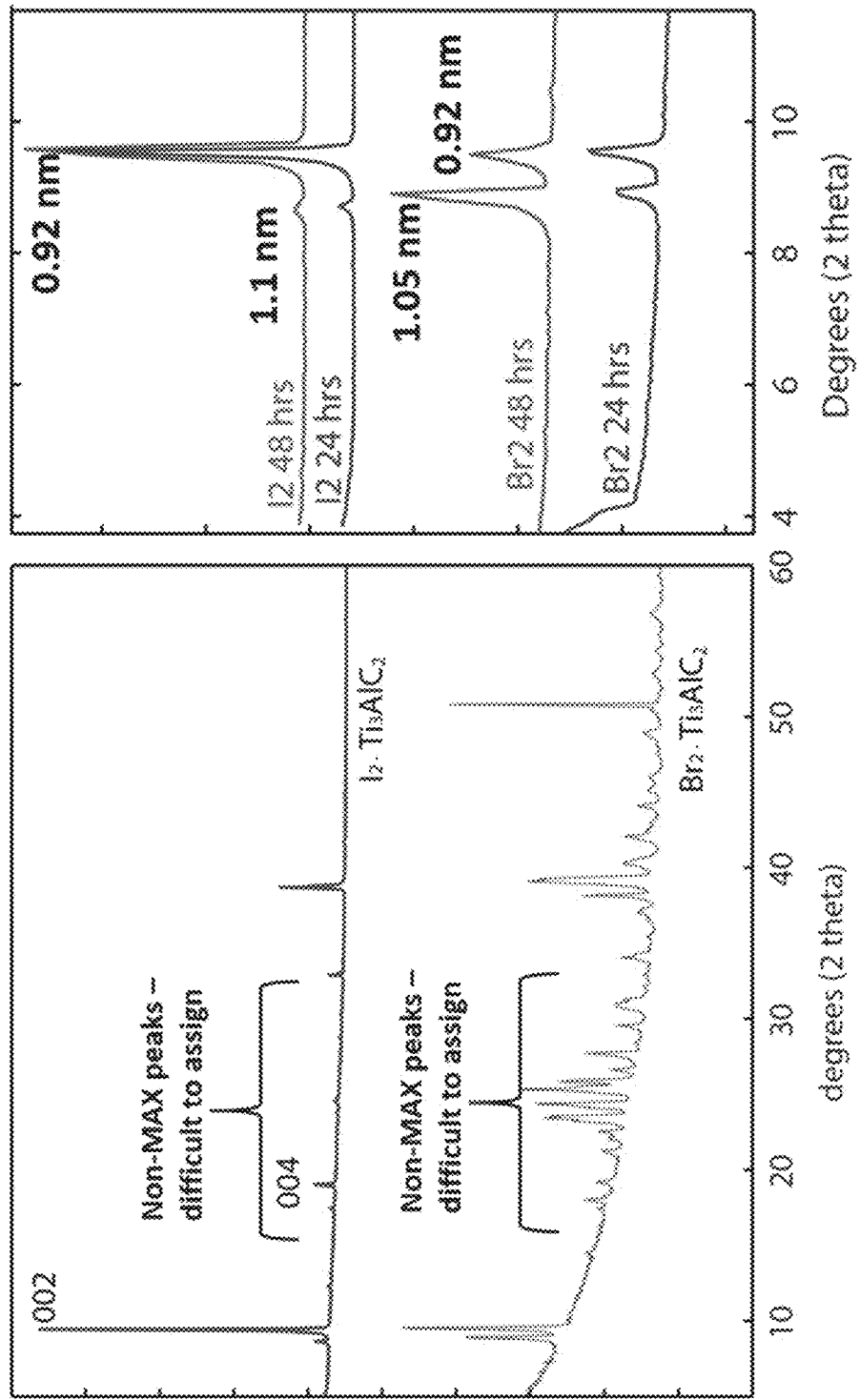
FIG. 31 presents the structure analysis of X$_2$ etched Ti$_3$AlC$_2$ in MeOH.

FIG. 31 presents the structure analysis of $X_2$ etched $Ti_3AlC_2$ in MeOH.

| Etchant | 00 $\ell$ | % volume increase |
|---|---|---|
| $Ti_3AlC_2$ | 0.95 nm | — |
| HF (OH terminated) | 1.0 nm | 5% |
| $Br_2$ (Br terminated?) | 1.05 nm | 10.5% |
| $I_2$ (I terminated?) | 1.1 nm | 15.7% |
| $Ti_3C_2$ | 0.75 nm | −21% |

New interlayer spacings indicate MAX phase is being etched, which is internally consistent ($I_2$ etched has larger spacing than $Br_2$ etched). The reaction is slower for $I_2$ than for $Br_2$, and relative intensity of MAX:Etched decreases over 48 hours.

Figure 32:
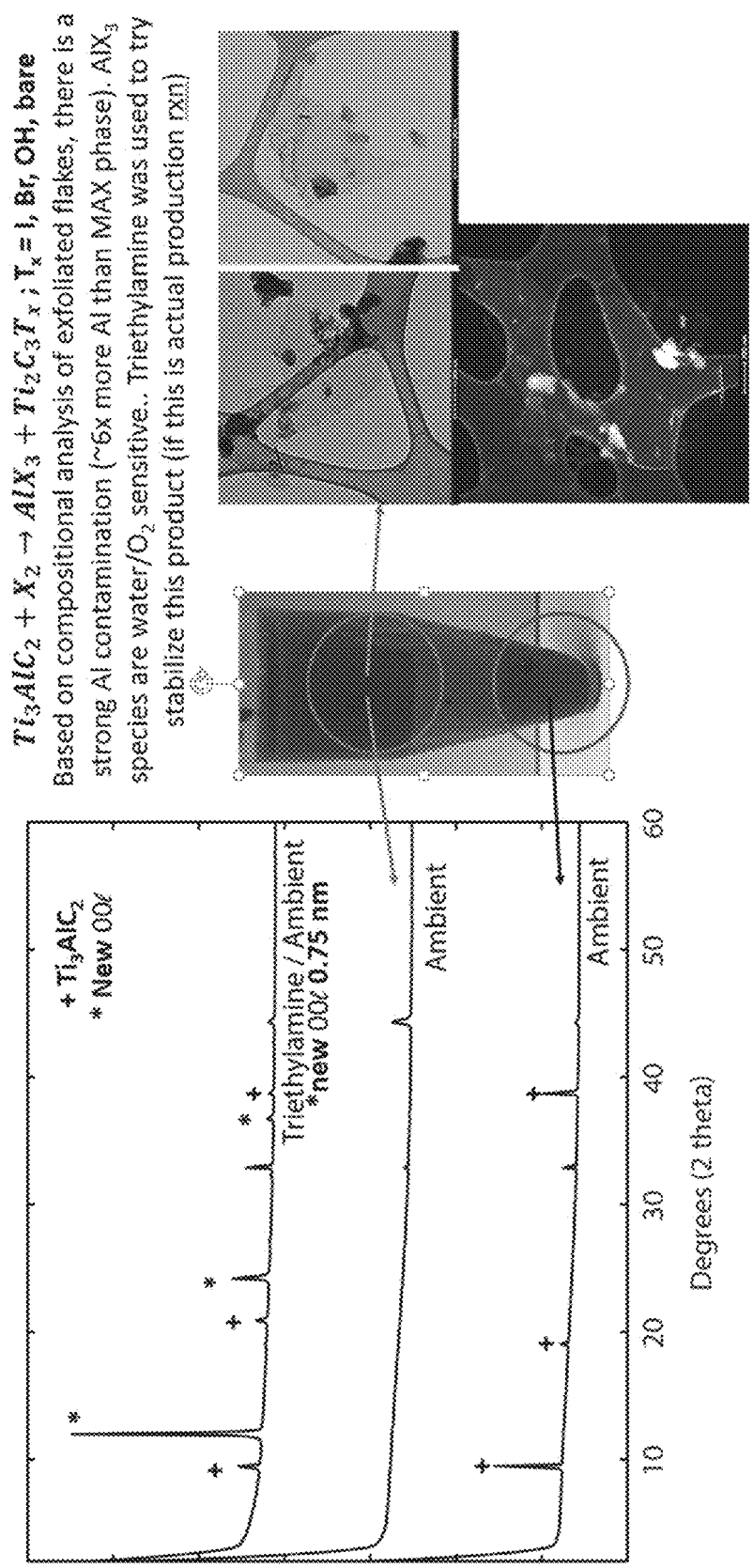
FIG. 32 presents the processing of Br$_2$ reactions.

FIG. 32 presents the processing of $Br_2$ reactions. The reaction is assumed to be: $Ti_3AlC_2 + X_2 \rightarrow AlX_3$ $Ti_3C_2T_x$; $T_x$=I, Br, OH, bare Based on the compositional analysis of exfoliated flakes, there is a strong Al contamination (~6× more Al than MAX phase). $AlX_3$ species are water/$O_2$ sensitive.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of making a layered MXene material comprising the steps of:
   a) introducing a dried MAX phase powder into a vessel under anhydrous, inert conditions, wherein the MAX phase powder comprises a general formula of $m_{n+1}AX_n$ (n=1, 2, 3, or 4),
   wherein M is a transition metal or p-block metalloid selected from the group consisting of Ti, Zr, Hf, V, Nb, Ta, Cr, Mo, W, Re, Cu, Ni, Ag, Zn, Cd, In, Sn, and Pb;
   interlayer A is a Group III, IV, or V metalloid and is selected from the group consisting of Al, Si, Ga, Ge, In, Sn, Pb, As, Bi, Sb, and
   X is one of C (carbon) and N (nitrogen);
   b) introducing a halogen and solvent to the dried MAX phase to create a halogen solution having a predetermined concentration;
   c) allowing a reaction to proceed for about 24 hours between 30-90° C. to create a reaction slurry comprising a MXene material; and
   d) monitoring the reaction to observe interlayer spacing of the MAX phase, wherein the reaction is complete when the ratio of the peak intensities remains constant or when the MAX phase peak disappears;
   e) extracting the reaction slurry via addition of anhydrous chloroform, acetone, acetonitrile, or tetrahydrofuran;
   f) centrifuging at about 10000 rpm to separate an $AX_3$ product from the MXene materials;
   g) discarding the supernatant containing the $AX_3$ product, and adding fresh chloroform, acetone, acetonitrile, or tetrahydrofuran and repeating this process as desired, resulting in a MXene slurry.

2. The method of claim 1, further comprising,
   i.) suspending the slurry in a non-polar solvent;
   j.) centrifuging at 1000 rpm for 1 hour to sediment any un-exfoliated MAX phase materials;
   k.) collecting the supernatant which contains MXene flakes.

3. The method of claim 2, further comprising,
   l.) Quenching or extracting excess halogen with a Lewis base.

4. The method claim 1, wherein the halogen and solvent of step b) are at least one of non-polar solvents selected from the group consisting of cyclohexane, benzene, toluene, xylenes, naphtha, anthrazene, carbon disulfide, chloroform, and dichloromethane, or polar solvents selected from the group consisting of methanol and acetonitrile, with at least one of iodine ($I_2$) and bromine ($Br_2$) to create a 15-25 wt % halogen solution.

5. The method of claim 4, wherein the time period of about 24 hours is anywhere between 1 and 36 hours, and when bromine ($Br_2$) is selected the temperature of about 35° C. is anywhere between 30-90° C.

6. The method of claim 2, wherein the non-polar solvent is at least one of THF (tetrahydrofuran), acetonitrile, and $CHCl_3$.

7. The method of claim 2, wherein the non-polar solvent is at least one of $CS_2$, $CHCl_3$, cyclohexane, and benzene, with the addition of tetrabutylammonium halide (TBAX; X=F, Cl, Br, I) stabilizer comprising a non-nucleophilic, coordinating Lewis base.

8. The method of claim 1, wherein introducing a halogen of step b) further comprises:
   b1) introducing elemental $X_2$, wherein X=F, Cl, Br, or I.

9. The method of claim 1, wherein introducing a halogen of step b) further comprises:
   b1) introducing an in-situ halogen generating species.

10. The method of claim 1, wherein introducing a halogen of step b) further comprises:
    b1) introducing one or more solid state organo or inorganic halogen precursors, such as $PX_5$, $PX_3$ (X=Cl, Br), N-bromohalides (NBX; X=Cl, Br, I).

11. The method of claim 1, wherein introducing a halogen of step b) further comprises:
    b1) introducing one or more mixed halogen species selected from the group consisting of iodine monochloride, iodine monobromide, and bromine monochloride.

12. The method of claim 1, wherein an etching rate of the A-interlayer is tunable by changing reactant concentrations of 5-20 vol % X, where X=Cl, Br, I and operating temperatures of −70° C. to 80° C. in step c.

* * * * *